(12) United States Patent
Hinds et al.

(10) Patent No.: US 12,132,954 B2
(45) Date of Patent: Oct. 29, 2024

(54) SMART CLIENT FOR STREAMING OF SCENE-BASED IMMERSIVE MEDIA

(71) Applicant: TENCENT AMERICA LLC, Palo Alto, CA (US)

(72) Inventors: Arianne Hinds, Palo Alto, CA (US); Stephan Wenger, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 6 days.

(21) Appl. No.: 18/119,074

(22) Filed: Mar. 8, 2023

(65) Prior Publication Data

US 2023/0336795 A1   Oct. 19, 2023

Related U.S. Application Data

(60) Provisional application No. 63/331,152, filed on Apr. 14, 2022.

(51) Int. Cl.
*H04N 21/44* (2011.01)
*H04L 65/75* (2022.01)
(Continued)

(52) U.S. Cl.
CPC ....... *H04N 21/44012* (2013.01); *H04L 65/75* (2022.05); *H04N 21/23418* (2013.01);
(Continued)

(58) Field of Classification Search
CPC ....... H04N 21/44016; H04N 21/23418; H04N 21/4331; H04N 21/44012; H04N 21/4516; H04L 65/75
See application file for complete search history.

(56) References Cited

U.S. PATENT DOCUMENTS

2012/0249550 A1   10/2012   Akeley et al.
2013/0198342 A1*   8/2013   Xu .......................... H04L 65/612
                                                                    709/219
(Continued)

OTHER PUBLICATIONS

Tencent Technology, ISRWO, PCT/US2023/014987, Jun. 16, 2023, 17 pgs.

*Primary Examiner* — Jefferey F Harold
*Assistant Examiner* — Alexander Boyd
(74) *Attorney, Agent, or Firm* — Morgan, Lewis & Bockius LLP

(57) ABSTRACT

A method for streaming scene-based media assets during a media streaming session performed by a computing device is provided. The method includes providing a bi-directional interface for communicating information about scene-based media assets between a network server and the computing device acting as a client device; and providing, to the network server via the interface, client device attributes and corresponding information related to availability of client device resources when requested, wherein the client device attributes and the information are used by the computing device for rendering the scene-based media assets. For example, the computing device receives a request from the network server and then determines whether the requested scene-based media assets is to be streamed from the network server or not by accessing a list of locally stored, previously streamed scene-based media assets. The network server then generates the scene-based media assets or their proxies and inserts them into the media streaming session to be streamed to the computing device for rendering the scene-based media assets.

20 Claims, 23 Drawing Sheets

(51) Int. Cl.
*H04N 21/234* (2011.01)
*H04N 21/433* (2011.01)
*H04N 21/45* (2011.01)

(52) U.S. Cl.
CPC ... *H04N 21/4331* (2013.01); *H04N 21/44016* (2013.01); *H04N 21/4516* (2013.01)

(56) References Cited

U.S. PATENT DOCUMENTS

| | | |
|---|---|---|
| 2017/0099463 A1 | 4/2017 | Trani |
| 2017/0289639 A1 | 10/2017 | Reisner |
| 2020/0204849 A1 | 6/2020 | Loheide et al. |
| 2020/0327740 A1* | 10/2020 | Frommhold ............ G06T 19/20 |
| 2020/0344498 A1 | 10/2020 | Lazar et al. |
| 2021/0250396 A1 | 8/2021 | Gandhi et al. |
| 2022/0086253 A1* | 3/2022 | Newton .............. H04L 67/5682 |
| 2022/0309743 A1* | 9/2022 | Harviainen .......... H04N 21/472 |

* cited by examiner

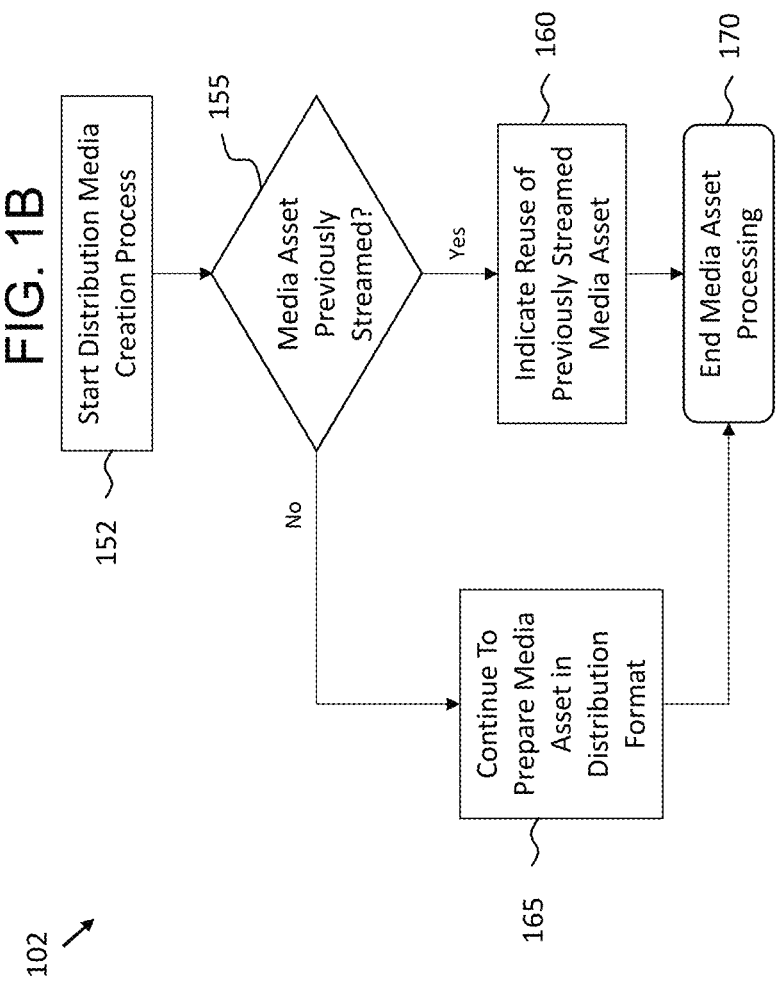

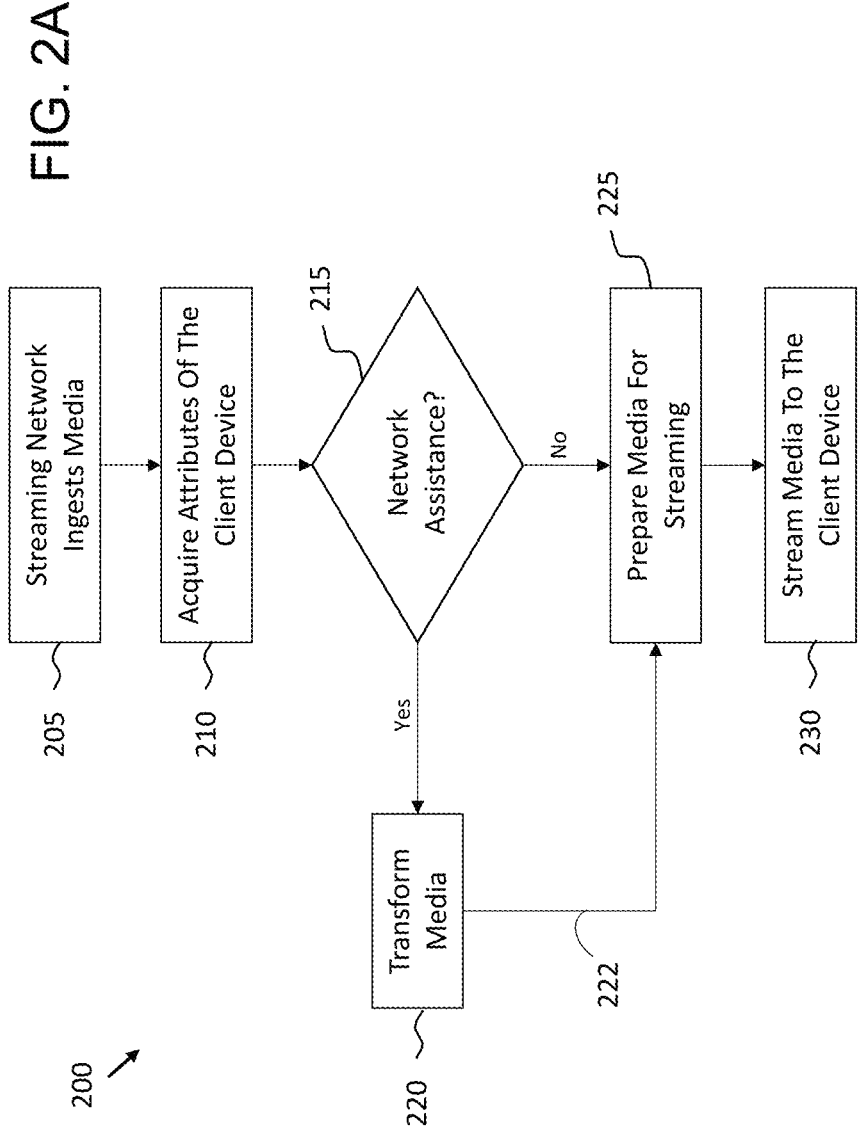

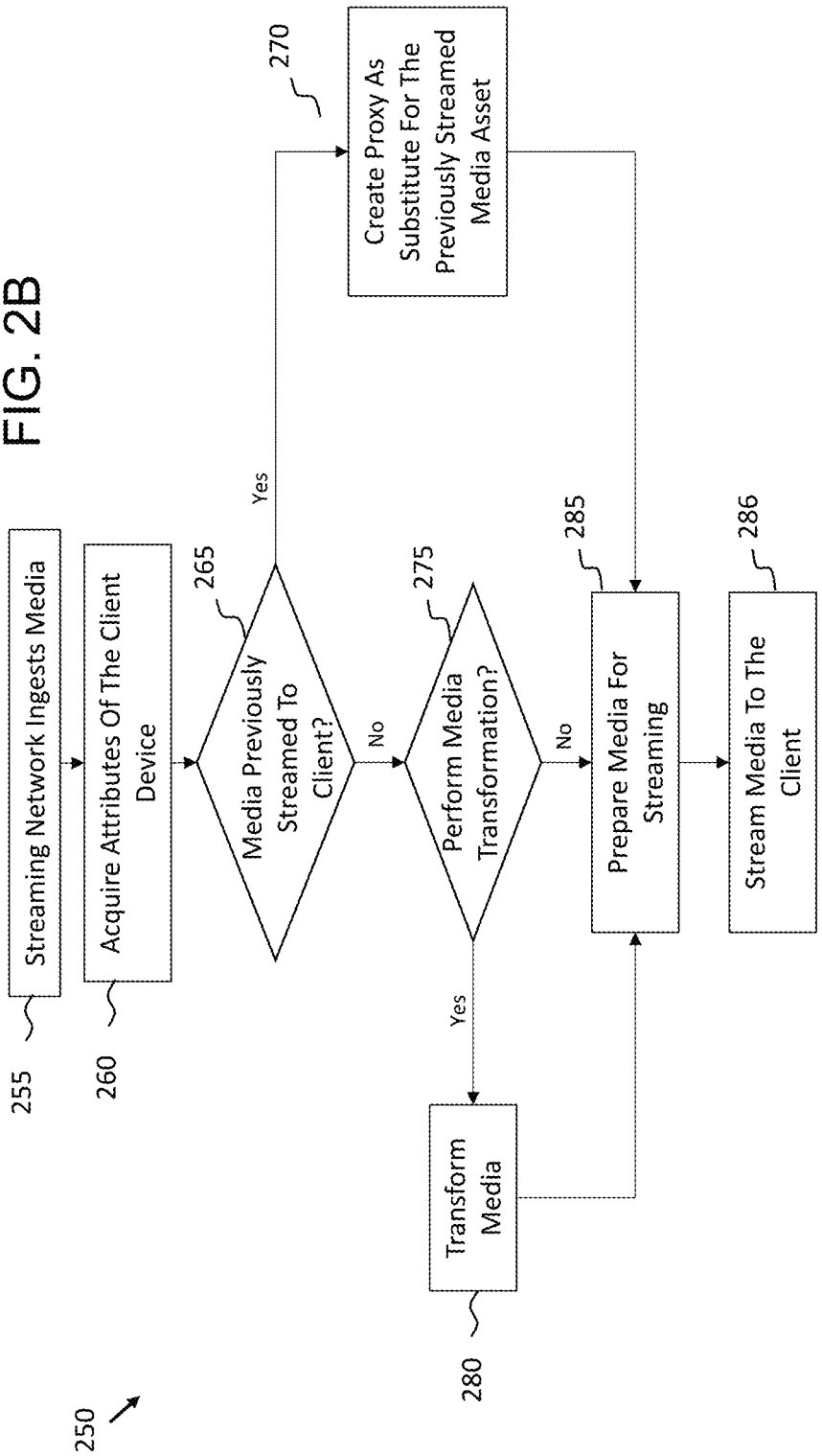

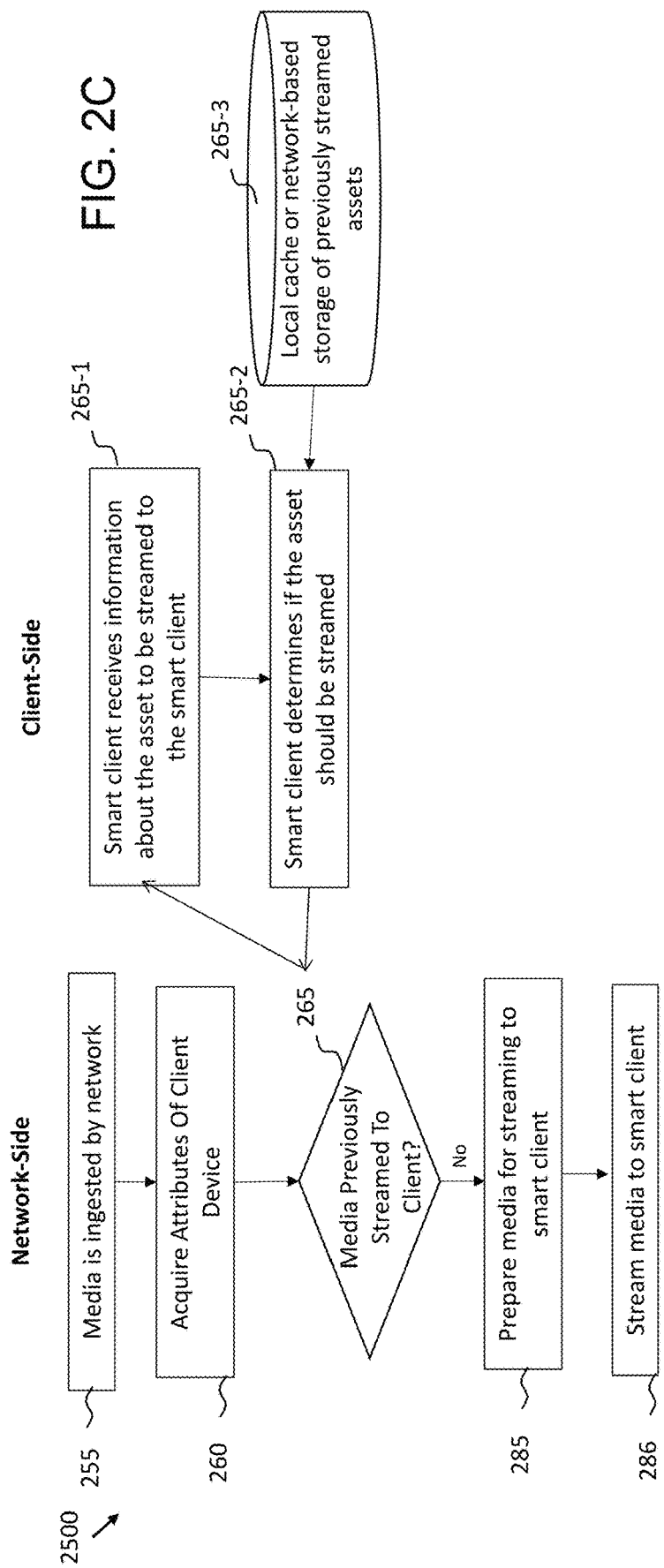

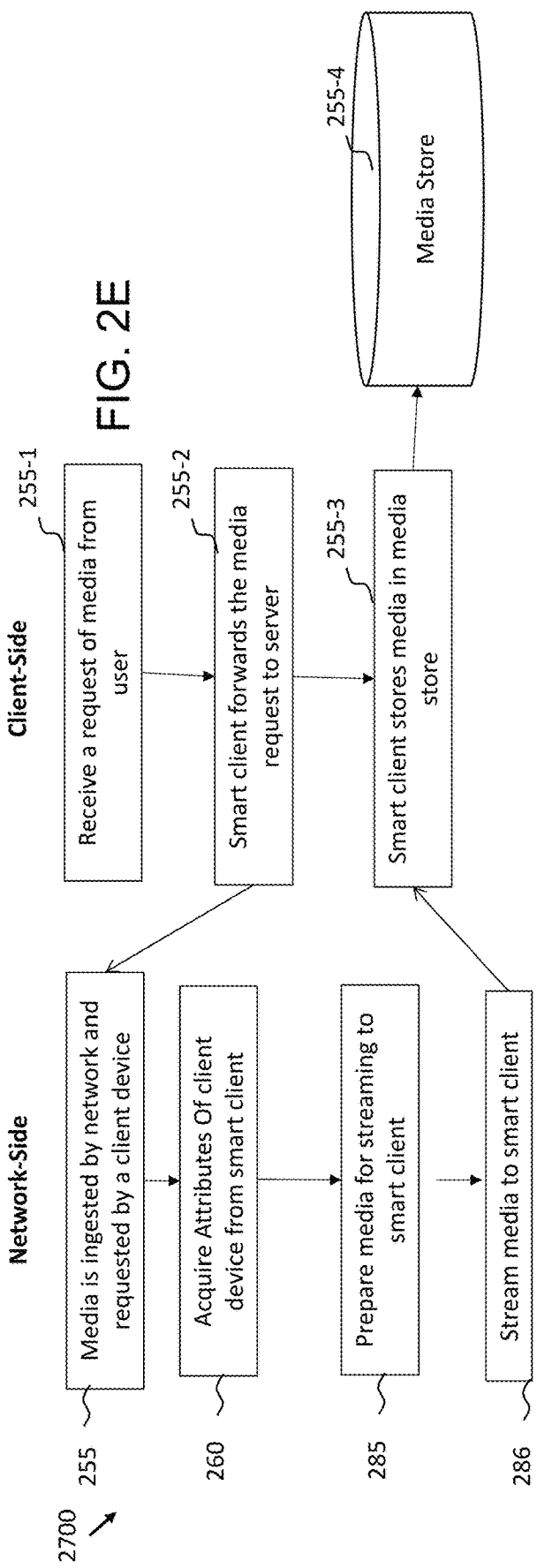

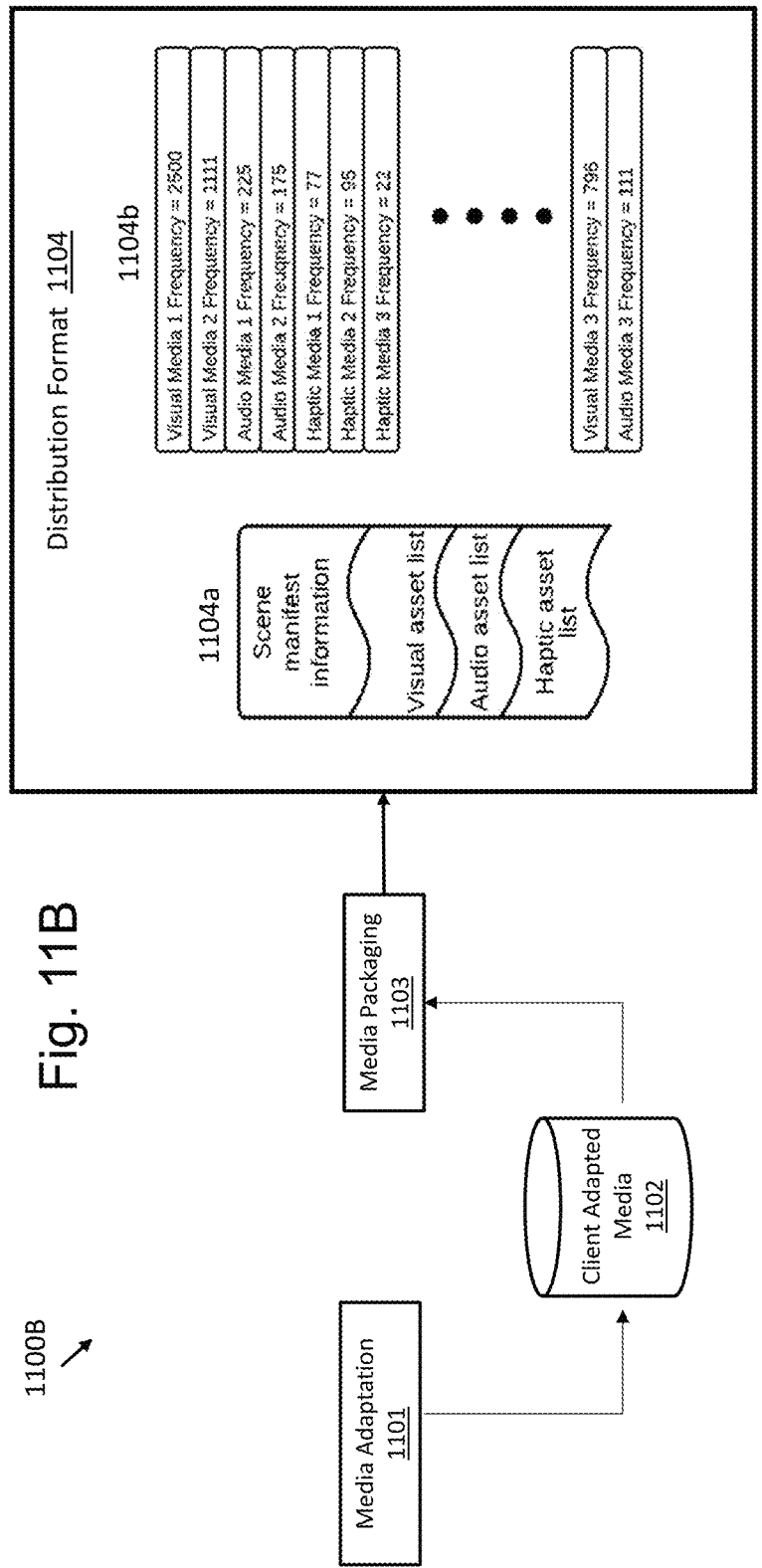

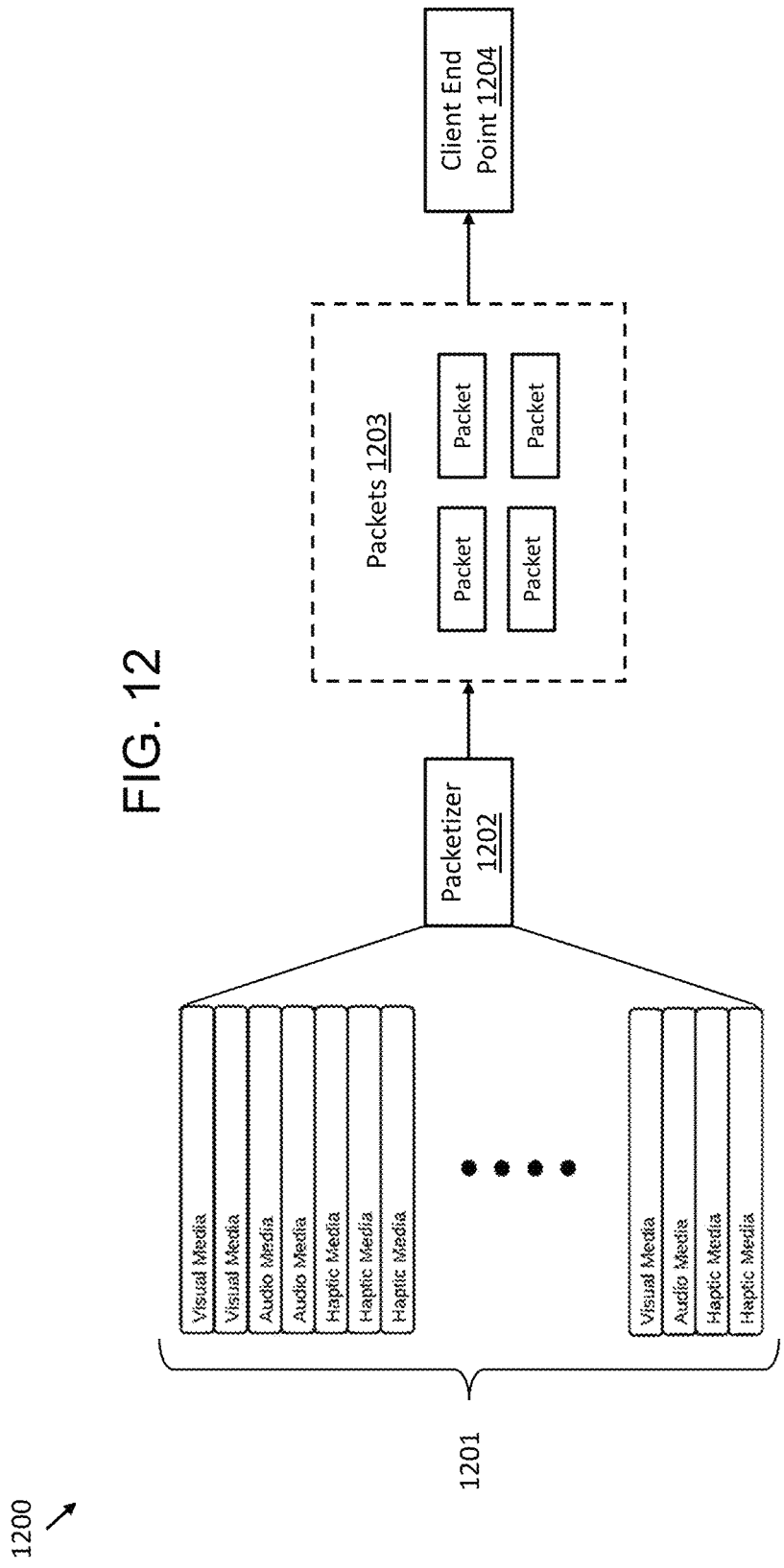

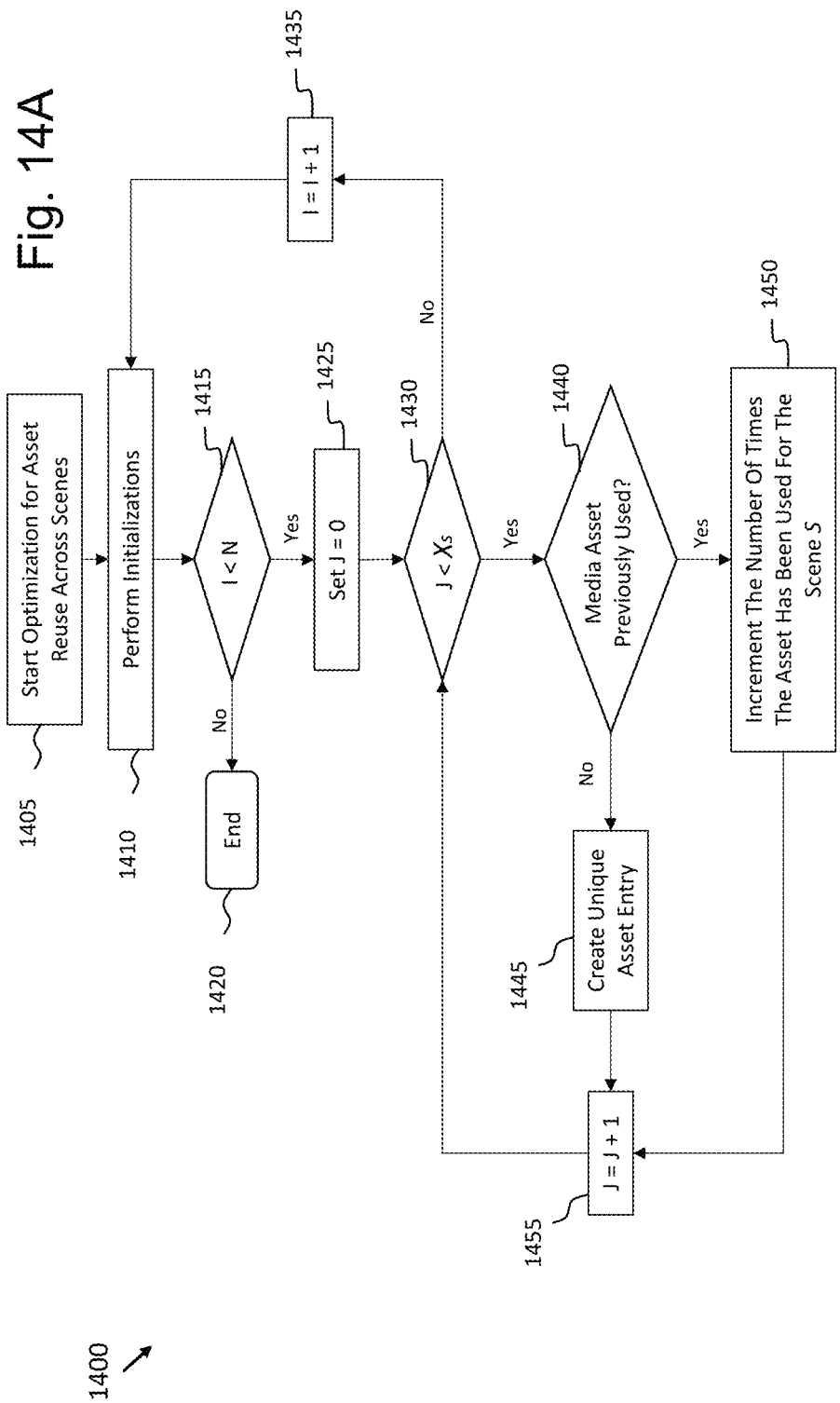

FIG. 14B

Set of Lists of Unique Media Assets 1465

| Scene 1 unique assets | | |
|---|---|---|
| Type | Identifier | #Used |
| Mesh | MeshID1 | 1 |
| Audio | AudioID1 | 4 |
| Volume | VolumeID1 | 2 |

| Scene 2 unique assets | | |
|---|---|---|
| Type | Identifier | #Used |
| Haptic | HapticID1 | 2 |
| Audio | AudioID2 | 1 |
| Mesh | MeshID2 | 2 |

| Scene N-1 unique assets | | |
|---|---|---|
| Type | Identifier | #Used |

SMART CLIENT FOR STREAMING OF SCENE-BASED IMMERSIVE MEDIA

CROSS-REFERENCE TO RELATED APPLICATION

This application is based on and claims priority to U.S. Provisional Patent Application No. 63/331,152, entitled "SMART CLIENT FOR STREAMING OF SCENE-BASED IMMERSIVE MEDIA" filed on Apr. 14, 2022, the disclosure of which is incorporated by reference herein in its entirety.

TECHNICAL FIELD

The present disclosure describes embodiments generally related to architectures, structures and components for systems and networks that distribute media, including video, audio, geometric (3D) objects, haptics, associated metadata, or other content for a client device. Particular embodiments are directed systems, structures, and architectures for distribution of media content to heterogenous immersive and interactive client devices.

BACKGROUND

Immersive Media generally refers to media that stimulates any or all human sensory systems (e.g., visual, auditory, somatosensory, olfactory, and possibly gustatory senses) to create or enhance the perception of the user being physically present in the experience of the media, i.e., beyond what is distributed over existing (e.g., "legacy") commercial networks for timed two-dimensional (2D) video and corresponding audio; such timed media also being known as "legacy media." Immersive media may also be defined as media that attempts to create or imitate the physical world through digital simulation of kinetics and laws of physics, thereby stimulating any or all human sensory systems to create the perception by the user of being physically present inside a scene that depicts a real or virtual world.

Immersive media-capable presentation devices may refer to devices equipped with sufficient resources and capabilities to access, interpret, and present immersive media. Such immersive media-capable devices support a plurality of quantities and formats of media and also support a plurality of network resources required to distribute the immersive-media at scale. "At scale" may refer to the distribution of media by service providers that achieve distribution equivalent to that of legacy video and audio media over networks, e.g., Netflix, Hulu, Comcast subscriptions, and Spectrum subscriptions.

In contrast, legacy presentation devices such as laptop displays, televisions, and mobile handset displays are homogenous in their capabilities because all these devices comprise rectangular display screens that consume 2D rectangular video or still images as their primary visual media formats. Some of the visual media formats commonly used in legacy presentation devices may include High Efficiency Video Coding/H.265, Advanced Video Coding/H.264, and Versatile Video Coding/H.266.

The term "frame-based" media refers to the characteristic that the visual media are comprised of one or more consecutive rectangular frames of imagery. In contrast, "scene-based" media refers to visual media that are organized by "scenes" in which each scene refers to individual assets that collectively describe the visual scene.

A comparative example between frame-based and scene-based visual media is illustrated in the case of visual media illustrating a forest. In the frame-based representation, the forest is captured using camera devices such as those provided on mobile phones. The user enables the camera to focus on the forest and the frame-based media that is captured by the phone is the same as what the user sees through the camera viewport provided on the phone, including any movement of the camera initiated by the user. The resulting frame-based representation of the forest is a series of 2D image frames that are recorded by the camera usually at a standard rate of 30 frames-per-second or 60 frames-per-second. Each image frame is a collection of pixels where the information stored in each pixel is congruent, one pixel to the next.

A scene-based representation of a forest is comprised of individual assets that describe each of the objects in the forest. For example, the scene-based representation may include individual objects called "trees" where each tree is comprised of a collection of smaller assets called "trunks," "branches," and "leaves." Each tree trunk may be further described individually by a mesh that describes the full 3D geometry of the trunk and a texture that is applied to the tree-trunk mesh to capture the color and radiance properties of the trunk. Furthermore, the trunk may be accompanied by additional information that describes the surface of the trunk in terms of its smoothness or roughness or ability to reflect light. The individual assets that comprise the scene vary in terms of the type and quantities of information that is stored in each asset.

The distribution of any media over networks may employ media delivery systems and architectures that reformat and/or convert the media from an input format or network "ingest" media format to a distribution media format where that distribution media format is not only suitable to be ingested by the targeted client device and its applications but is also conducive to being "streamed" over the network. The network typically performs two processes upon the ingested media: 1) transforming the media from a format A into a format B that is suitable to be ingested by the target client, i.e., based upon the client's capabilities to ingest certain media formats, and 2) preparing the media to be streamed.

"Streaming" of media broadly refers to the fragmenting and or packetizing of the media so that it can be delivered over the network in consecutive smaller-sized "chunks" logically organized and sequenced according to either or both the media's temporal or spatial structure. "Transforming," (also referred to as "transcoding") of media from a format A to a format B may be a process that is performed, usually by the network or by the service provider, prior to distributing the media to the client. Such transcoding may be comprised of converting the media from a format A to a format B based upon prior knowledge that format B is a preferred format, or the only format, that can be ingested by the target client, or is better suited for distribution over a constrained resource such as a commercial network. One example of the transformation of media is the conversion of the media from a scene-based representation to a frame-based representation. In some cases, both steps of transforming the media and preparing the media to be streamed are necessary before the media can be received and processed by the client instead.

The above one or two-step processes acted upon the ingested media by the network, i.e., prior to distributing the media to the client, results in a media format referred to as a "distribution media format," or simply, "distribution format." In general, these steps should be performed only once, if performed at all, for a given media data object, if the network has access to information to indicate that the client needs the transformed and/or streamed media object for multiple occasions. That is, the processing and transfer of data for transformation and streaming of media is generally regarded as a source of latency with the requirement for expending potentially significant amount of network and/or compute resources. Hence, there is a need for a network design that has access to information to indicate when a client potentially already has a particular media data object stored in its cache or stored locally with respect to the client.

SUMMARY

According to embodiments, methods, systems, and apparatus are provided for facilitation a process to determine whether a client device already has access to a copy of a media asset and/or media object stored on a local cache managed by the client device, or a new copy of the media asset should be generated by and inserted into a media stream session by a network server. According to embodiments, the processes disclosed herein may be performed by the server or the client device or jointly.

According to an aspect of the disclosure, a method for streaming scene-based media assets during a media streaming session performed by a computing device is provided. The method includes providing a bi-directional interface for communicating information about scene-based media assets between a network server and the computing device acting as a client device; and providing, to the network server via the interface, client device attributes and corresponding information related to availability of client device resources when requested, wherein the client device attributes and the information are used by the computing device for rendering the scene-based media assets.

According to another aspect of the disclosure, a computing device for streaming media assets during a media streaming session is provided. The computing device includes at least one memory configured to store computer program code; and at least one processor configured to execute the computer program code to perform the aforementioned method of streaming scene-based media assets during a media streaming session.

According to another aspect of the disclosure, a non-transitory computer-readable medium is provided storing instructions that, when executed by at least one processor of a computing device, cause the computing device to perform the aforementioned method of streaming scene-based media assets during a media streaming session.

Additional embodiments will be set forth in the description that follows and, in part, will be apparent from the description, and/or may be realized by practice of the presented embodiments of the disclosure.

BRIEF DESCRIPTION OF THE DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

FIG. 1B is an exemplary workflow illustrating creation of media in distribution format and generation of reuse indicator(s) in a media streaming network, according to embodiments.

FIG. 2A is an exemplary workflow illustrating streaming media to a client device, according to embodiments.

FIG. 2B is an exemplary workflow illustrating streaming media to a client device, according to embodiments.

FIG. 2C is an exemplary workflow illustrating streaming media to a smart client with the addition of the smart client determining if previously streamed media is still available in a local or otherwise nearby cache and reporting it to the network, according to embodiments.

FIG. 2E is an exemplary workflow illustrating streaming media to a smart client with the addition of the smart client requesting and receiving media streamed from the network process, according to embodiments.

FIG. 11B is an exemplary workflow illustrating creation of media in the distribution format with the assets ordered by the asset type and the frequency by which the assets are used across the entire presentation based on asset type, according to embodiments.

FIG. 12 is an exemplary workflow illustrating a packetizing process, according to embodiments.

FIG. 14A is an exemplary workflow illustrating a reuse analysis of media, according to embodiments.

FIG. 14B is an example of a set of lists of unique assets for scenes in a presentation, according to embodiments.

DETAILED DESCRIPTION

Figure 1A:
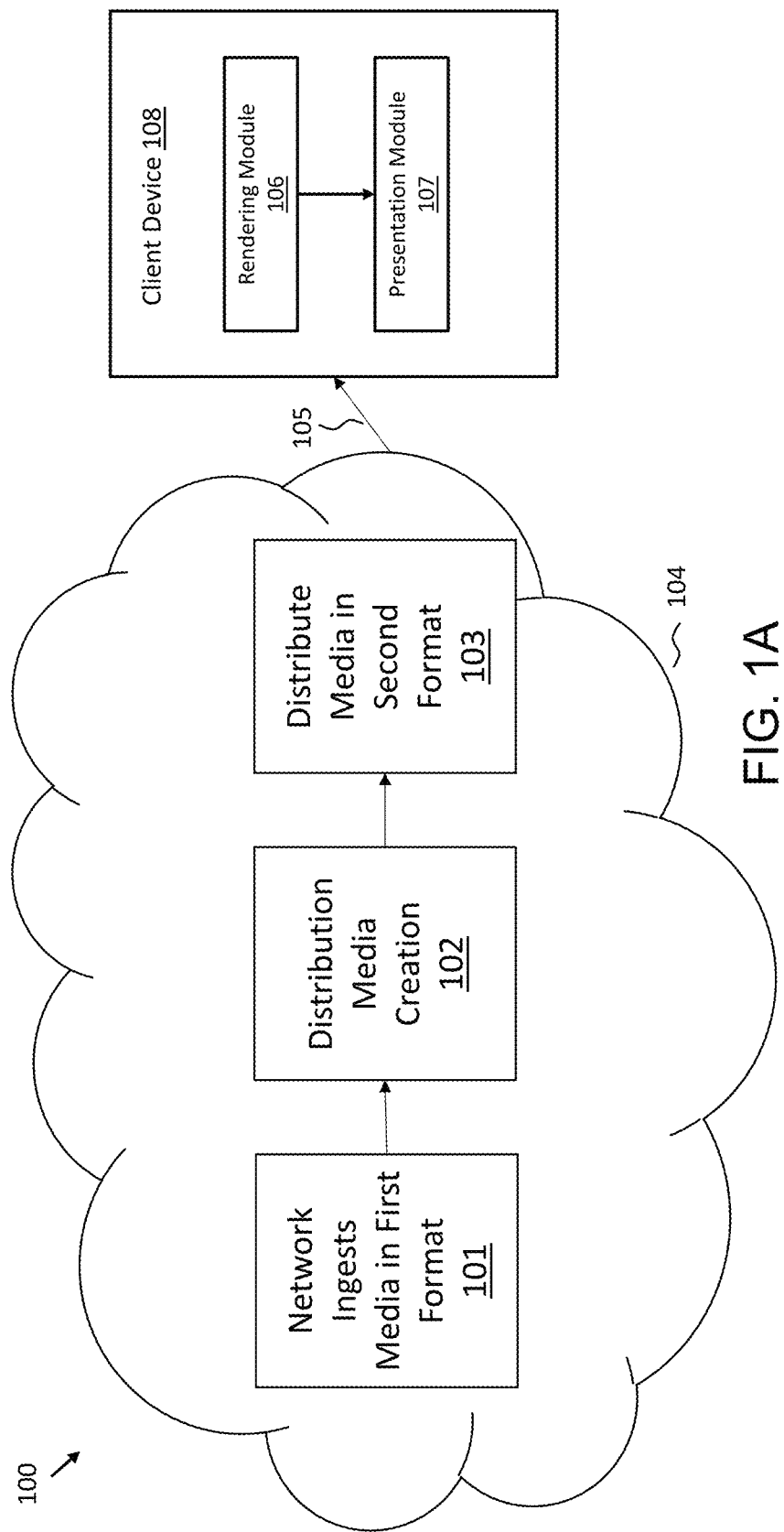
FIG. 1A is an exemplary illustration of media distribution to a client device in a media streaming network, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

According to embodiments, immersive media-capable presentation devices may refer to devices equipped with sufficient resources and capabilities to access, interpret, and present immersive media. Such devices are heterogeneous in terms of the quantities and formats of the media that they may support, and the amount and types of network resources required to distribute such media at scale. "At scale" may refer to the distribution of media by service providers that achieve distribution equivalent to that of legacy video and audio media over networks, e.g., Netflix, Hulu, Comcast subscriptions, and Spectrum subscriptions.

According to embodiments, client devices that serve as endpoints for distribution of immersive media over a network are all very diverse. The distribution of any media over networks may employ media delivery systems and architectures that reformat the media from an input or network "ingest" media format to a distribution media format where that distribution media format is not only suitable to be ingested by the targeted client device and its applications but is also conducive to being "streamed" over the network. Thus, there may be two processes that are performed upon the ingested media by the network: 1) converting the media from a format A into a format B that is suitable to be ingested by the target client, i.e., based upon the client's capabilities to ingest certain media formats, and 2) preparing the media to be streamed.

In embodiments, streaming media broadly refer to the fragmenting and or packetizing of the media so that it can be delivered over the network in consecutive smaller-sized chunks logically organized and sequenced according to either or both the media's temporal or spatial structure. Transforming (sometimes referred to as "transcoding") of media from a Format A to a Format B may be a process that is performed, usually by the network or by the service provider, prior to distributing the media to the client device. Such transcoding may be comprised of converting the media from a Format A to a Format B based upon prior knowledge that Format B is a preferred format, or the only format, that can be ingested by the target client device, or is better suited for distribution over a constrained resource such as a commercial network. In many cases, but not all, both steps of transforming the media and preparing the media to be streamed are necessary before the media can be received and processed by the target client device from the network.

Converting (or transforming) the media and preparing the media for streaming are steps in a process which are acted upon the ingested media by the network prior to distributing the media to the client device. The result of the process (i.e., converting and preparing for streaming) is a media format referred to as a distribution media format, or simply, the distribution format. These steps should be performed only once, if performed at all for a given media data object, if the network has access to information to indicate that the client will need the transformed and or streamed media object for multiple occasions that otherwise would trigger the transformation and streaming of such media multiple times. That is, the processing and transfer of data for transformation and streaming of media is generally regarded as a source of latency with the requirement for expending potentially significant amount of network and or compute resources. Hence, a network design that does not have access to information to indicate when a client potentially already has a particular media data object stored in its cache or stored locally with respect to the client, will perform sub-optimally to a network that does have access to such information.

A scene graph may be general data structure commonly used by vector-based graphics editing applications and modern computer games, which arranges the logical and often (but not necessarily) spatial representation of a graphical scene, or it may be a collection of nodes and vertices in a graph structure.

A scene, in the context of computer graphics, may be a collection of objects (e.g., 3D assets—may also be known as media assets, media objects, objects, and assets), object attributes, and other metadata that comprise the visual, acoustic, and physics-based characteristics describing a particular setting that is bounded either by space or time with respect to the interactions of the objects within that setting.

A node may be a fundamental element of the scene graph comprised of information related to the logical or spatial or temporal representation of visual, audio, haptic, olfactory, gustatory, or related processing information; each node shall have at most one output edge, zero or more input edges, and at least one edge (either input or output) connected to it.

A base layer may be a nominal representation of a media asset, usually formulated to minimize the compute resources or time needed to render the asset, or the time to transmit the asset over a network.

An enhancement layer may be a set of information that when applied to the base layer representation of an asset, augments the base layer to include features or capabilities that are not supported in the base layer.

An attribute may be metadata associated with a node used to describe a particular characteristic or feature of that node either in a canonical or more complex form (e.g. in terms of another node).

A container may be a serialized format to store and exchange information to represent all natural, all synthetic, or a mixture of synthetic and natural scenes including a scene graph and all of the media resources that are required for rendering of the scene Serialization may be the process of translating data structures or object state into a format that can be stored (for example, in a file or memory buffer) or transmitted (for example, across a network connection link) and reconstructed later (possibly in a different computer environment). When the resulting series of bits is reread according to the serialization format, it can be used to create a semantically identical clone of the original object.

Renderer may be a (typically software-based) application or process, based on a selective mixture of disciplines related to: acoustic physics, light physics, visual perception, audio perception, mathematics, and software development, that, given an input scene graph and asset container, emits a typically visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g. repackaged into another container i.e. used in a series of rendering processes in a graphics pipeline); for audio-based media assets, a renderer may emit an audio signal for presentation in a multi-channel loudspeaker and/or binauralized headphones, or for repackaging into another (output) container. Popular examples of renderers include the real-time rendering features of the game engines Unity and Unreal Engine.

Scripting language may be an interpreted programming language that can be executed by a renderer at runtime to process dynamic input and variable state changes made to the scene graph nodes, which affect rendering and evaluation of spatial and temporal object topology (including physical forces, constraints, inverse kinematics, deformation, collisions), and energy propagation and transport (light, sound).

A shader may be a type of computer program that was originally used for shading (the production of appropriate levels of light, darkness, and color within an image) but which now performs a variety of specialized functions in various fields of computer graphics special effects or does video post-processing unrelated to shading, or even functions unrelated to graphics at all.

Path Tracing is a computer graphics method of rendering three-dimensional scenes such that the illumination of the scene is faithful to reality.

Timed media may include media and/or media objects that may be ordered by time; e.g., with a start and end time according to a particular clock. Untimed media may include media and/or media objects that may be organized by spatial, logical, or temporal relationships; e.g., as in an interactive experience that is realized according to the actions taken by the user(s).

A neural network model (NN Model) may be a collection of parameters and tensors (e.g., matrices) that define weights (i.e., numerical values) used in well-defined mathematical operations applied to the visual signal to arrive at an improved visual output which may include the interpolation of new views for the visual signal that were not explicitly provided by the original signal.

The number of immersive media-capable devices that have been introduced into the consumer market, including head-mounted displays, augmented-reality glasses, hand-held controllers, multi-view displays, haptic gloves, and game consoles has exploded in the last decade. In addition, holographic displays and other forms of volumetric displays are poised to emerge into the consumer market within the next three to five years. However, despite the immediate or imminent availability of these devices, a coherent end-to-end ecosystem for the distribution of immersive media over commercial networks has failed to materialize for several reasons.

One of the reasons that a coherent end-to-end ecosystem for distribution of immersive media over commercial networks has not been realized is that the client devices that serve as endpoints for such a distribution network for immersive displays are all very diverse. Some client devices support certain immersive media formats while others do not. Some can create an immersive experience from legacy raster-based formats, while others cannot. Unlike a network designed only for distribution of legacy media, a network that must support a diversity of display clients' needs a significant amount of information pertaining to the specifics of each of the client's capabilities, and the formats of the media to be distributed, before such network can employ an adaptation process to translate the media into a format suitable for each target display and corresponding application. Such a network, at a minimum, would need access to information describing the characteristics of each target display and the complexity of the ingested media for the network to ascertain how to meaningfully adapt an input media source to a format suitable for the target display and application.

A network supporting such heterogeneous client devices should leverage the fact that some of the assets that are adapted from an input media format to a specific target format may be reused across a set of similar display targets. That is, some assets, once converted to a format suitable for a target display may be reused across several such displays that have similar adaptation requirements. Therefore, such a network that employs a caching mechanism to store adapted assets into an area that is relatively immutable would be more efficient.

Immersive media may be organized into "scenes" that are described by scene graphs, which are also known as scene descriptions. The scope of scene graphs may be to describe visual, audio, and other forms of immersive assets that comprise a particular setting that is part of a presentation, for example, the actors and events taking place in a particular location in a building that is part of a presentation, e.g., movie. A list of all scenes that comprise a single presentation may be formulated into a manifest of scenes.

A benefit of a "scene" based approach is that for content that is prepared in advance of having to distribute such content, a "bill of materials" can be created that identifies all of the assets that will be used for the entire presentation, and how often each asset is used across the various scenes within the presentation. A network having the knowledge of the existence of cached resources that can be used to satisfy the asset requirements for a particular presentation. Similarly, a client device that is presenting a series of scenes may wish to have knowledge about the frequency of any given asset to be used across multiple scenes. For example, if a media asset (also known as media object, asset, or object) is referenced multiple times across multiple scenes that are or will be processed by the client device, then the client device should avoid discarding the asset from its caching resources until the last scene that requires that particular asset has been presented by the client.

For legacy presentation devices, the distribution format may be equivalent or sufficiently equivalent to the "presentation format" ultimately used by the client presentation device to create the presentation. That is, a presentation media format is a media format whose properties (resolution, framerate, bit-depth, colour gamut, etc, . . . ) are closely tuned to the capabilities of the client presentation device. Some examples of distribution vs. presentation formats include: a High-Definition (HD) video signal (1920 pixel columns×1080 pixel rows) distributed by a network to an Ultra-high-definition (UHD) client device with resolution (3840 pixel columns×2160 pixel rows). The UHD client may apply a process called "super-resolution" to the HD distribution format to increase the resolution of the video signal from HD to UHD. Thus, the final signal format that is presented by the client device is the "presentation format" which, in this example, is a UHD signal, whereas the HD signal comprises the distribution format. In this example, the HD signal distribution format is very similar to the UHD signal presentation format because both signals are in a rectilinear video format, and the process to convert the HD format to a UHD format is a relatively straightforward and easy process to perform on most legacy client devices.

However, in some embodiments, the preferred presentation format for the targeted client device may be significantly different from the ingest format received by the network. Nevertheless, the client device may have access to sufficient compute, storage, and bandwidth resources to transform the media from the ingest format into the necessary presentation format suitable for presentation by the client device. The network may bypass the step of reformatting the ingested media, e.g., "transcoding" the media, from a first format A to a second format B because the client has access to sufficient resources to perform all media transforms without the network having to do so apriori. The network may still perform the step of fragmenting and packaging the ingest media so that the media may be streamed to the client.

In some embodiments, however, the ingested media received by the network is significantly different from the client's preferred presentation format, and the client device does not have access to sufficient compute, storage, and or bandwidth resources to convert the media to the preferred presentation format. In the absence of access to resources, the network may assist the client by performing some or all of the transformation from the ingest format into a format that is either equivalent or nearly equivalent to the client device's preferred presentation format on behalf of the client. In some embodiments, such assistance provided by the network on behalf of the client is commonly referred to as "split rendering."

Embodiments of the present disclosure as described herein addresses the need for a "smart client" mechanism or process that responds to the network server process(es) and participates in the architecture described herein, on behalf of the client device. Such a "smart client" mechanism is especially relevant in a network designed to stream scene-based media to immersive heterogenous and interactive client devices such that the distribution of media is performed efficiently, and within the constraints of the capabilities of the various components of a media streaming network as a whole. A "smart client" is associated with a particular client device that responds to the network's requests for information pertaining to the current state of its associated client device, including the availability of resources on the client device for rendering and creating presentations of scene-based media.

Note that the remainder of the present disclosure assumes, without loss of generality, that a smart client capable of responding on behalf of a particular client device is also capable of responding on behalf of a client device on which one or more applications are active. That is, the problem of responding on behalf of a client device is equivalent to the problem of responding on behalf of a client on which one or more applications are active.

Further note that the term "media object", "media asset" or "asset" may be used interchangeably, all referring to a specific instance of a specific format of media. The term "client device" or "client" (without any qualification) refers to the device and its constituent components on which the presentation of the media is ultimately performed. The term "smart client" may refer to the network-interactive capability of a client described in the present disclosure or a client that has the network-interactive capability.

FIG. 1A is an exemplary illustration of a media distribution process 100 to distribute media from a network cloud, edge device, or server 104 to a computing device acting as a client device 108. according to embodiments. As shown in FIG. 1A, media, including immersive media comprising one or more scenes and one or more media objects, in a first format A (hereafter "ingest media Format A") is received from a content provider. The processing (i.e., media flow process 100) may be performed or executed by a network cloud or edge device (hereafter "network device 104") and distributed to a client, for example client device 108. In some embodiments, the same processing may be performed a priori in a manual process or by a client device. The network device 104 may ingest media in a first format 101, generate and/or create distribution media 102 in a second format (hereafter "distribution media creation 102"), and distribute media in the second format 103, for example using a distribution module. The client device 108 may include a rendering module 106 and a presentation module 107.

According to an aspect, the network device 104 may receive ingested media from a content provider or the like. The media streaming network may obtain the ingested media that is stored in an ingest media Format A. Distribution media may be created and/or generated using any necessary transformations or conditioning of the ingested media to create a potentially alternative representation of the media. That is, a distribution format for media objects in the ingest media may be created. As mentioned, the distribution format is a media format that may be distributed to the client by formatting the media into a distribution Format B. The distribution Format B is a format that is prepared to be streamed to the client device 108. Distribution media creation 102 may include an optimization reuse logic to perform a decision-making process to determine if a particular media object has already been streamed to the client device 108. Further operations associated with distribution media creation 102 and the optimization reuse logic will be described in detailed with reference to FIG. 1B.

Media Formats A and B may or may not be representations following the same syntax of a particular media format specification, however the Format B is likely to be conditioned into a scheme that facilitates the distribution of the media over a network protocol. The network protocol may be, e.g., a connection-oriented protocol (TCP) or a connectionless protocol (UDP). The distribution module at the network device 104 streams the stream-able media (i.e., media Format B) from the network device 104 to the client device 108 via a network connection 105.

The client device 108 may receive the distribution media and render media for the presentation using rendering module 106. The rendering module 106 may have access to some rendering capabilities which may be rudimentary or likewise, sophisticated, depending on the client device 108 that is being targeted. The rendering module 106 may create presentation media in a presentation format C. The presentation format C may or may not be represented according to a third format specification. Therefore, the presentation format C may be the same or different from media formats A and/or B. The rendering module 106 outputs the presentation format C to the presentation module 107, which may present the presentation media in a display (or the like) of the client device 108.

Embodiments of the present disclosure facilitate a decision-making process that is employed by a network to compute a sequence order in which to package and stream assets from a network to a client. In this case, all assets that are utilized across the set of one or more scenes that comprise a presentation, are analyzed by a media reuse analyzer to determine the frequency by which each asset is used throughout all scenes that comprise the presentation. The order in which assets for a particular scene are packaged and streamed to a client may therefore be based on the frequency by which each asset is used across the set of scenes that comprise a presentation.

Embodiments address the need for a mechanism or process that analyzes an immersive media scene to obtain sufficient information that may be used to support a decision making process that, when employed by a network or a client, provides an indication as to whether the transformation of a media object from a Format A to a Format B should be performed either entirely by the network, entirely by the client, or via a mixture of both (along with an indication of which assets should be transformed by the client or network). Such an immersive media data complexity analyzer may be employed by either a client or a network in an automated context, or by manually by, e.g., a human operating the system or device.

According to embodiments, the process of adapting an input immersive media source to a specific end-point client device may be the same as, or similar to, the process of adapting the same input immersive media source to the specific application that is being executed on the specific client end-point device. Therefore, the problem of adapting an input media source to the characteristics of an end-point device are of the same complexity as the problem of adapting a specific input media source to the characteristics of a specific application.

FIG. 1B is a workflow of distribution media creation 102, according to embodiments. More specifically, the workflow of FIG. 1B is a reuse logic decision making process that aids in the decision-making process to determine if a particular media object has already been streamed to the client device 108.

At 152, the distribution media creation process is started. At 155, conditional logic may be performed to determine if a current media object has previously been streamed to the client device 108. A list of unique assets may be accessed for the presentation to determine if the media object has been previously streamed to the client. If the current media object has been previously streamed, the process proceeds to operation 160. At operation 160, an indicator (later also referred to as a "proxy") is created to identify that the client has already received the current media object, and should access a copy of the media object from a local cache or other cache. If it is determined that the media object has not been previously streamed, the process proceeds to operation 165. At operation 165, the media object may be prepared for transformation and/or distribution and the distribution format for the media object is created. Subsequently, the processing ends for the current media object.

FIG. 2A is an exemplary workflow for processing ingested media through a network. The workflow illustrated in FIG. 2A depicts a media transform decision making process 200, according to embodiments. The media transform decision making process 200 is employed to determine if the network should transform the media prior to distributing the media to a client device. The media transform decision making process 200 may be processed through a manual or an automated process within the network.

Ingest media represented in Format A is provided by a content provider to the network. At 205, the media is ingested by the media streaming network from the content provider. At 210, attributes for the targeted client, if not already known, are acquired. The attributes describe the processing capabilities of the targeted client.

At 215, it is determined if the network (or the client) should assist with the transformation of the ingested media. In some embodiments, at 215, it may be specifically determined if any format conversions for any of the media assets contained within the ingested media (e.g., a conversion of a one or more media objects from Format A to Format B) are needed prior to the media being streamed to the targeted client. At 215, the determination may be based on whether the media can be streamed in its original ingested Format A, or if it must be transformed into a different format B to facilitate the presentation of the media by the client. Such a decision (i.e., to determine if a transformation of the ingest media is needed prior to streaming the media to the client, or if the media should be streamed in its original ingest Format A directly to the client) may require access to information describing aspects or features of the ingest media.

If it is determined that the network (or client) should assist with the transformation of any of the media assets (YES at 215), the process 200 proceeds to 220.

At 220, the ingested media is transformed from a Format A into a Format B producing transformed media 222. The transformed media 222 undergoes a preparation process at 225 for streaming the media to a client. In this case, the transformed media 222 (i.e., the input media at 225) is prepared to be streamed.

Streaming of immersive media, especially where such media is "scene-based" rather than "frame-based" may be relatively nascent. For example, streaming of frame-based media may be equivalent to streaming of frames of video, where each frame captures a full picture of the entire scene or a complete picture of the entire object to be presented by the client. The sequence of frames when reconstructed by the client from their compressed forms, and presented to the viewer, creates a video sequence that comprises the entire immersive presentation or a portion of the presentation. For frame-based streaming, the order in which the frames are streamed from the network to the client may be consistent with a predefined specification (e.g., such as ITU-T Recommendation H.264 Advanced Video Coding for Generic AudioVisual Services). However, unlike frame-based streaming, scene-based streaming of media may be comprised of individual assets that may be themselves independent of each other. A given scene-based asset may be used multiple times within a particular scene or across a series of scenes. The amount of time that a client, or any given renderer, needs to spend to reconstruct the particular asset may depend on a number of factors including, but not limited to, the size of the asset, the availability of compute resources to perform the rendering, and other attributes that describe the overall complexity of the asset. Clients that support scene-based streaming may require that some or all of the rendering for each of asset within a scene is completed before any of the presentation for the scene can begin. Hence the order in which assets are streamed from a network to the client may impact the overall performance of the system.

The transformations of media from Format A to another format (e.g., Format B) may be done either entirely by the network, entirely by the client, or jointly between both the network and the client. For split rendering, it becomes apparent that a lexicon of attributes that describe a media format may be needed so that both the client and network have complete information to characterize the work that must be done. Furthermore, a lexicon that provides attributes of a client's capabilities, e.g., in terms of available compute resources, available storage resources, and access to bandwidth, may likewise be needed. Even further, a mechanism to characterize the level of compute, storage, or bandwidth complexity of an ingest media format is needed so that the network and client may jointly, or singly, determine if or when the network may employ a split-rendering process for distributing the media to the client.

If it is determined that the network (or client) should not (or does not need to) assist with the transformation of any of the media assets (No at 215), the process 200 proceeds to 225. At 225, the media is prepared for streaming. In this case, the ingested data (i.e., the media in its original form) is prepared to be streamed.

Finally, once the media data is in a stream-able format, the media which has been prepared at 225 is streamed to the client at 230. In some embodiments, (as described with reference to FIG. 1B) if the transformation and or streaming of a particular media object that is or will be needed by the client to complete its presentation of the media may be avoided, then the network may skip transforming and/or streaming of the ingest media (i.e., 215-230), assuming that the client still has access or availability to the media object that it may need in order to complete the client's presentation of the media. With respect to the order in which scene-based assets are streamed from the network to the client to facilitate the client's ability to perform at its full potential, it may be desirable for a network to be equipped with sufficient information so that the network can determine such an order to improve the performance of the client. For example, such a network that has sufficient information to avoid repetitive transformation and/or streaming steps for assets that are used more than once, in a particular presentation, may perform more optimally than a network that is not designed this way. Likewise, a network that can "intelligently" sequence the delivery of assets to the client may facilitate the client's ability to perform at its full potential (i.e., to create an experience that may be more enjoyable to the end user).

FIG. 2B illustrates an exemplary media transform process 250 including an asset reuse process for determining media asset reuse and redundant cache, according to embodiments. Like the media transform decision making process 200, the media transform process 250 with asset reuse and using redundant cache processes ingest media through a network to determine if the network should transform the media prior to distributing the media to a client.

Ingest media represented in Format A is provided by a content provider to the network. According to an embodiment, operations 255-260 and 275-286 are performed similar to 205-210 and 215-230 shown in FIG. 2A. At 255, the media is ingested by the network from the content provider. Then, at 260, attributes for the targeted client, if not already known, are acquired. The attributes describe the processing capabilities of the targeted client.

If it is determined that the network has previously streamed a particular media object or current media object (Yes at 265), the process proceeds to 270. At 270, a proxy is created to substitute for the previously streamed media object to indicate that the client should use its local copy of the previously streamed object or the copy of the previously streamed object stored in the redundant cache managed by the media streaming network.

If it is determined that the network has not previously streamed the media object (No at 265), the process proceeds to 275. At 275, it is determined if the network or the client should perform any format transformations for any of the media assets contained within the ingested media at 255. For example, a transformation may include a conversion of a particular media object from a Format A to a Format B, prior to the media being streamed to the client. Operation 275 may be like those performed at 215 shown in FIG. 2A.

If it is determined media assets should be transformed by the network (Yes at 275), the process proceeds to 280. At 280, the media object is transformed from Format A to Format B. The transformed media is then prepared to be streamed to client (286).

If it is determined media assets should not be transformed by the network (No at 275), the process proceeds to 285. At 285, the media object is then prepared to be streamed to client. Once the media is in a stream-able format, the media prepared at 285 is streamed to the client at 286.

FIG. 2C illustrates an exemplary process 2500 of how the smart client on the client side helps the network side to determine if previously streamed media is still available in a local or otherwise nearby cache or not using the asset query logic implemented on the client side and the network side. The operations 255-265 on the network side are similar to the operations 255-265 as depicted in FIG. 2B, but with the asset query logic process implemented on the client side to illustrate the role of the smart client in determining when particular assets are already accessible to the client. At 255, media is ingested into the network. At 260, the network acquires attributes that describe the processing capabilities of targeted client (not depicted). The network then initiates a request to the asset query logic at the client side to determine if an asset should be streamed to the client or not. At 265-1, the smart client receives information from the network concerning the asset that is to be needed to the smart client for presentation. At 265-3, the smart client accesses a list of previously streamed assets stored at the local cache or network-based storage (e.g., a database) based on the request from the network. At 265-2, the smart client determines if the requested asset is already accessible to the client device and returns information about whether the asset should be streamed to the network's asset query logic regarding whether or not the asset in question should be streamed. If the asset does not need to be streamed, the network then proceeds to create a proxy for the asset in question at 270 and insert the proxy into the media to be prepared for streaming to the client at 285 as depicted in FIG. 2B. If the asset does need to be streamed to the client, the network then proceeds to determine if the network should assist in any transformation of the media to be streamed to the client at 275. If such a transformation is required (Yes at 275), the network performs the transformation on the media assets accordingly and then merge the transformed media asset into the media to be streamed to the client at 285. If the network determines that there is no need for such transformation (No at 275), the network then prepares the media with the original media asset to be streamed to the client. Finally, the network streams the media to the client at 286.

Figure 2D:
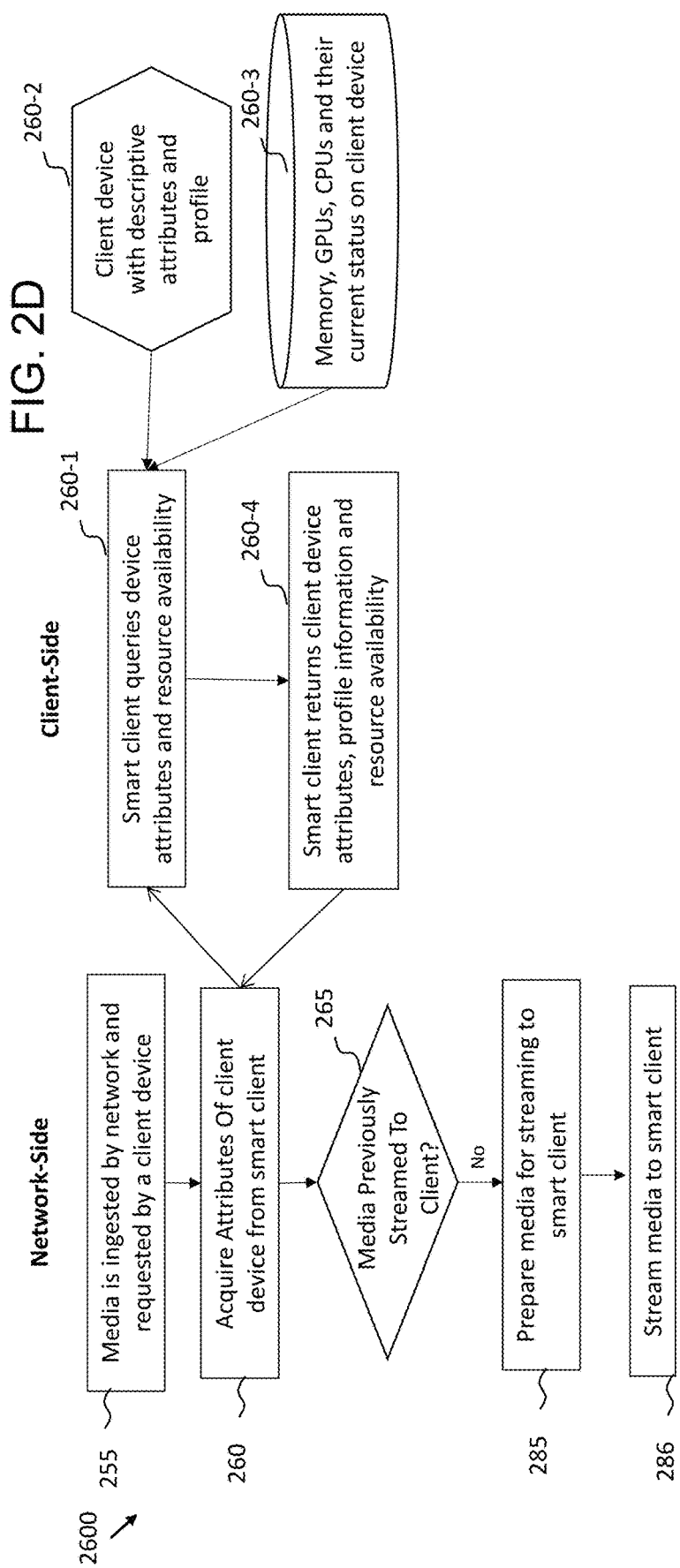
FIG. 2D is an exemplary workflow illustrating streaming media to a smart client with the addition of the smart client obtaining device status, profile information and resource availability and returning them to the network, according to embodiments.

FIG. 2D illustrates an exemplary process 2600 of how the smart client obtains its device status, profile information, and resource availability and returns such information to the network in connection with the asset reuse logic described above. The process 2600 is similar to the process 2500 as depicted in FIG. 2C, but with the operation of acquiring the attributes of the client performed by the smart client at the client side to illustrate the role of the smart client in acquiring information about the client device's capabilities including its status, profile, and availability of resources used to render the media. At 255, the media is ingested into the network and requested by a client device (not shown). The network then initiates a request to the smart client to acquire device attributes and resource status at 260. The smart client then initiates queries to the client device at 260-1 for its device attributes and resource availability. The client device then returns with the attributes about the client device (e.g., memory, GPUs, CPUs, and their current status) at 260-3 and descriptive information about its profile and other available resources, including resource availability to process future work, to the smart client at 260-2. The smart client then delivers the client device attributes that describe the processing capabilities of targeted client and the status and availability of resources on the client device to the network at 260-4. Based on the received information about the client, the network then determines if an asset should be streamed to the client or not at 265. If the asset does not need to be streamed, the network then proceeds to create a proxy for the asset in question at 270 and insert the proxy into the media to be prepared for streaming to the client at 285 as depicted in FIG. 2B. If the asset does need to be streamed to the client, the network then proceeds to determine if the network should assist in any transformation of the media to be streamed to the client at 275. If such a transformation is required (Yes at 275), the network performs the transformation on the media assets accordingly and then merge the transformed media asset into the media to be streamed to the client at 285. If the network determines that there is no need for such transformation (No at 275), the network then prepares the media with the original media asset to be streamed to the client. Finally, the network streams the media to the client at 286 as depicted in FIG. 2B.

FIG. 2E illustrates an exemplary process 2700 of how a smart client requests and receives media streamed from the network. The process 2700 is similar to the process 2600 as depicted in FIG. 2D, but with the addition of the request and receipt of media managed by the smart client on the client side. As depicted in FIG. 2E, the smart client first receives a request of media from a user at 255-1. For example, the request is received by the client device and then forwarded to the smart client at 255-1. The smart client then forwards the media request to the network server at 255-2. Upon receipt of the media request, the network server initiates the steps to acquire device attributes and resource status at 260 as depicted in FIG. 2B. Status and availability of resources on the client device are returned to the network server. The network then initiates the asset query logic as depicted in FIG. 2B to determine if an asset should be streamed to the client or not at 265. If the asset does not need to be streamed, the network then proceeds to create a proxy for the asset in question at 270 and insert the proxy into the media to be prepared for streaming to the client at 285 as depicted in FIG. 2B. If the asset does need to be streamed to the client, the network then proceeds to determine if the network should assist in any transformation of the media to be streamed to the client at 275. If such a transformation is required (Yes at 275), the network performs the transformation on the media assets accordingly and then merge the transformed media asset into the media to be streamed to the client at 285. If the network determines that there is no need for such transformation (No at 275), the network then prepares the media with the original media asset to be streamed to the client. Finally, the network streams the media to the client at 286 as depicted in FIG. 2B. The smart client then stores the media at the media store at 255-3 and the client device can access the media from the media store at 255-4.

Figure 3A:
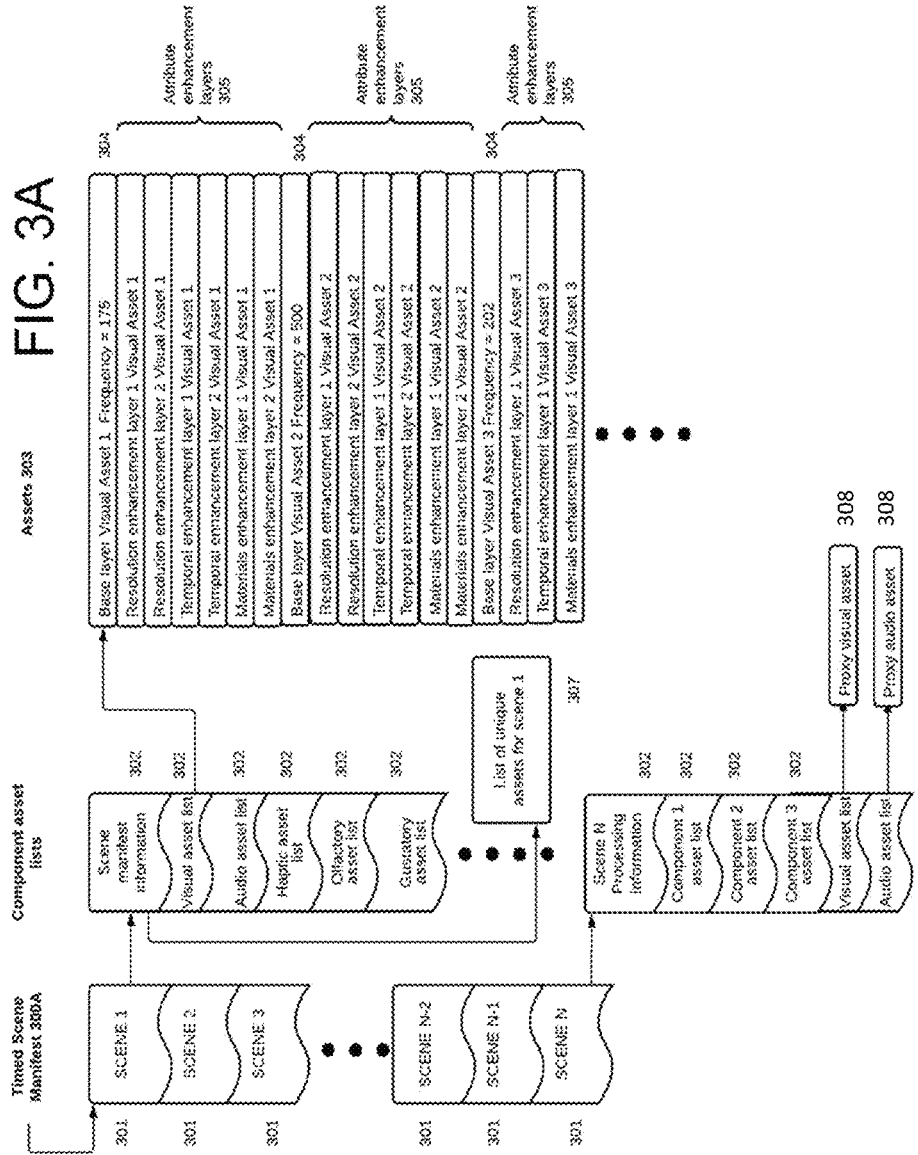
FIG. 3A is an exemplary illustration of a data model for the representation and streaming of timed immersive media, according to embodiments.
Figure 3B:
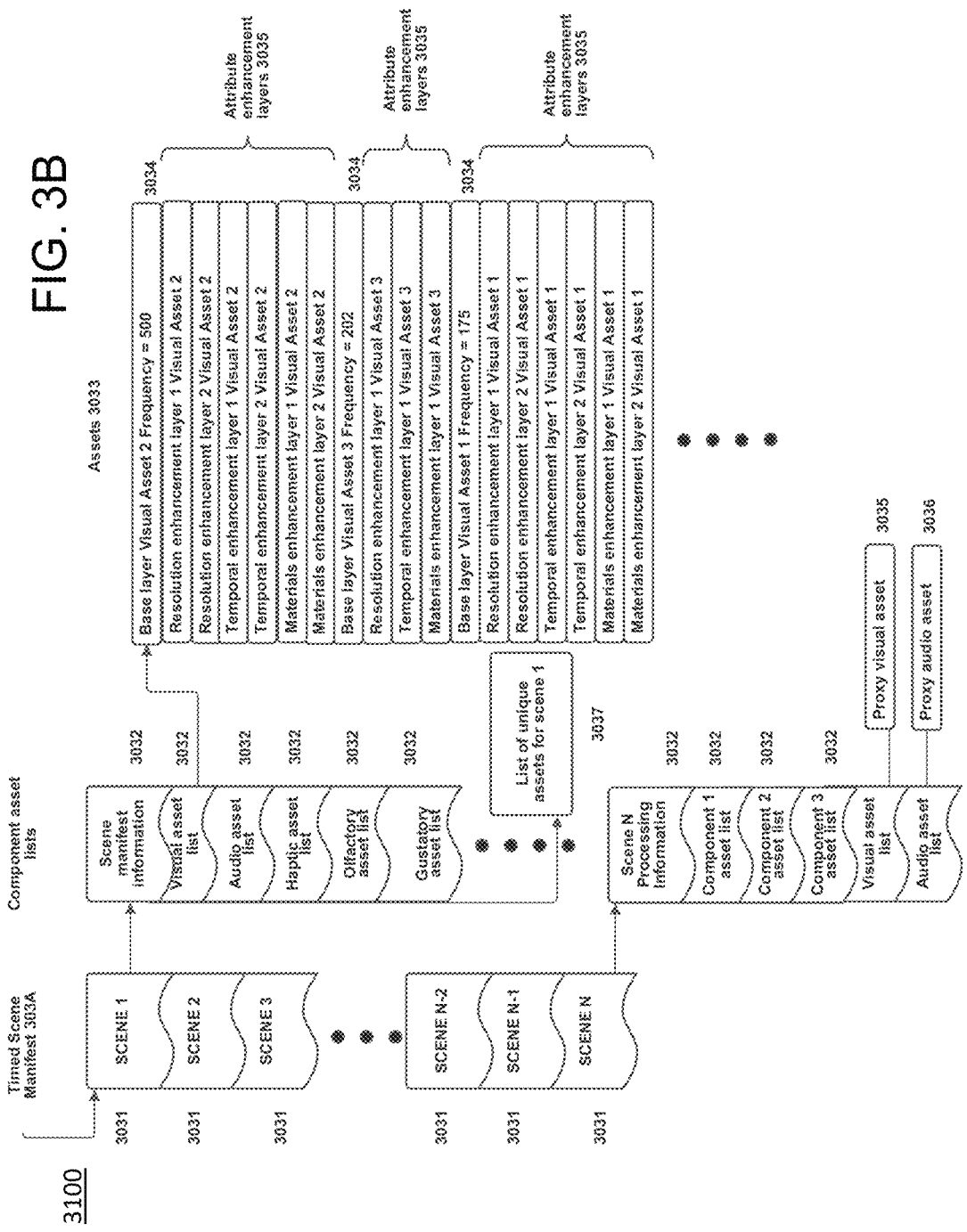
FIG. 3B is an exemplary illustration of a data model for the representation and streaming of timed immersive media with the visual assets ordered in the list based on descending frequency values, according to embodiments.
Figure 4A:
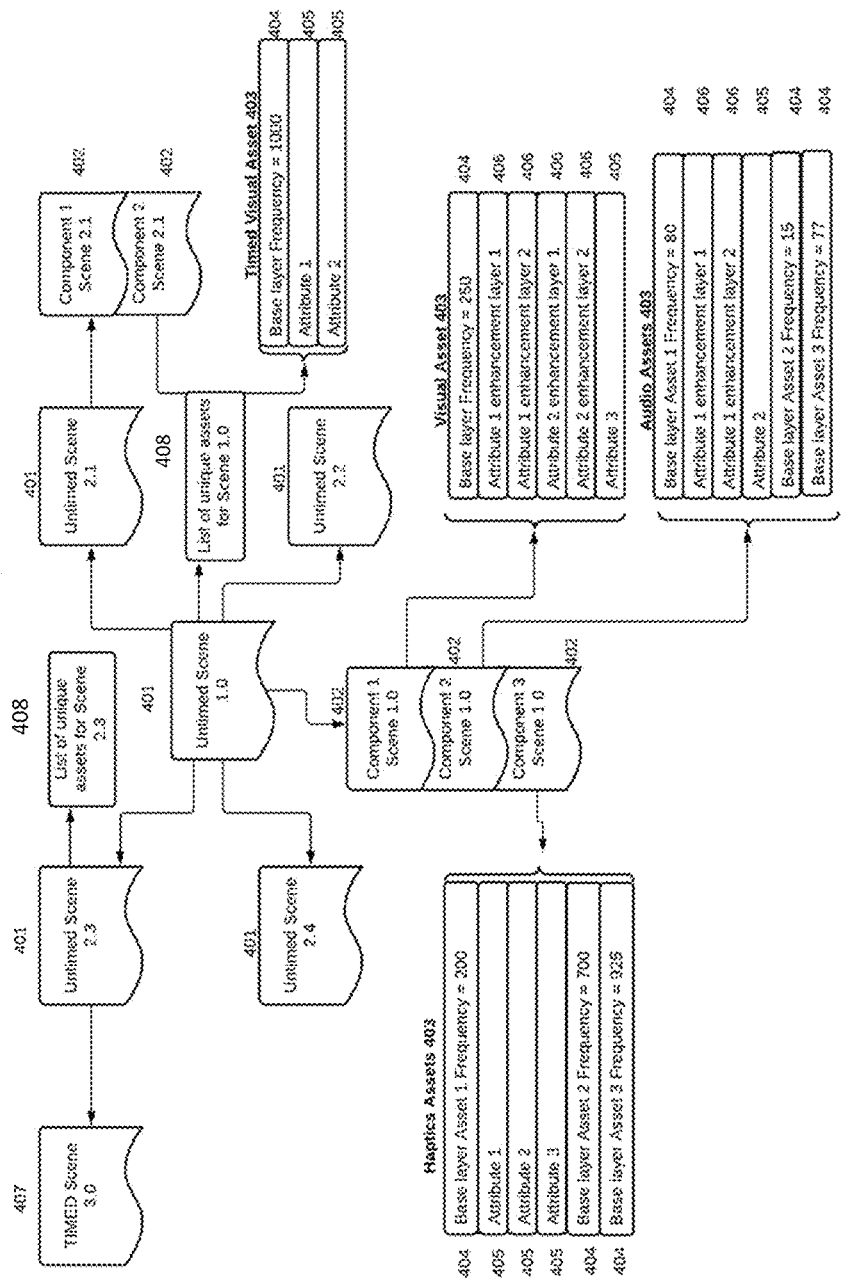
FIG. 4A is an exemplary illustration of a data model for the representation and streaming of untimed immersive media, according to embodiments.
Figure 4B:
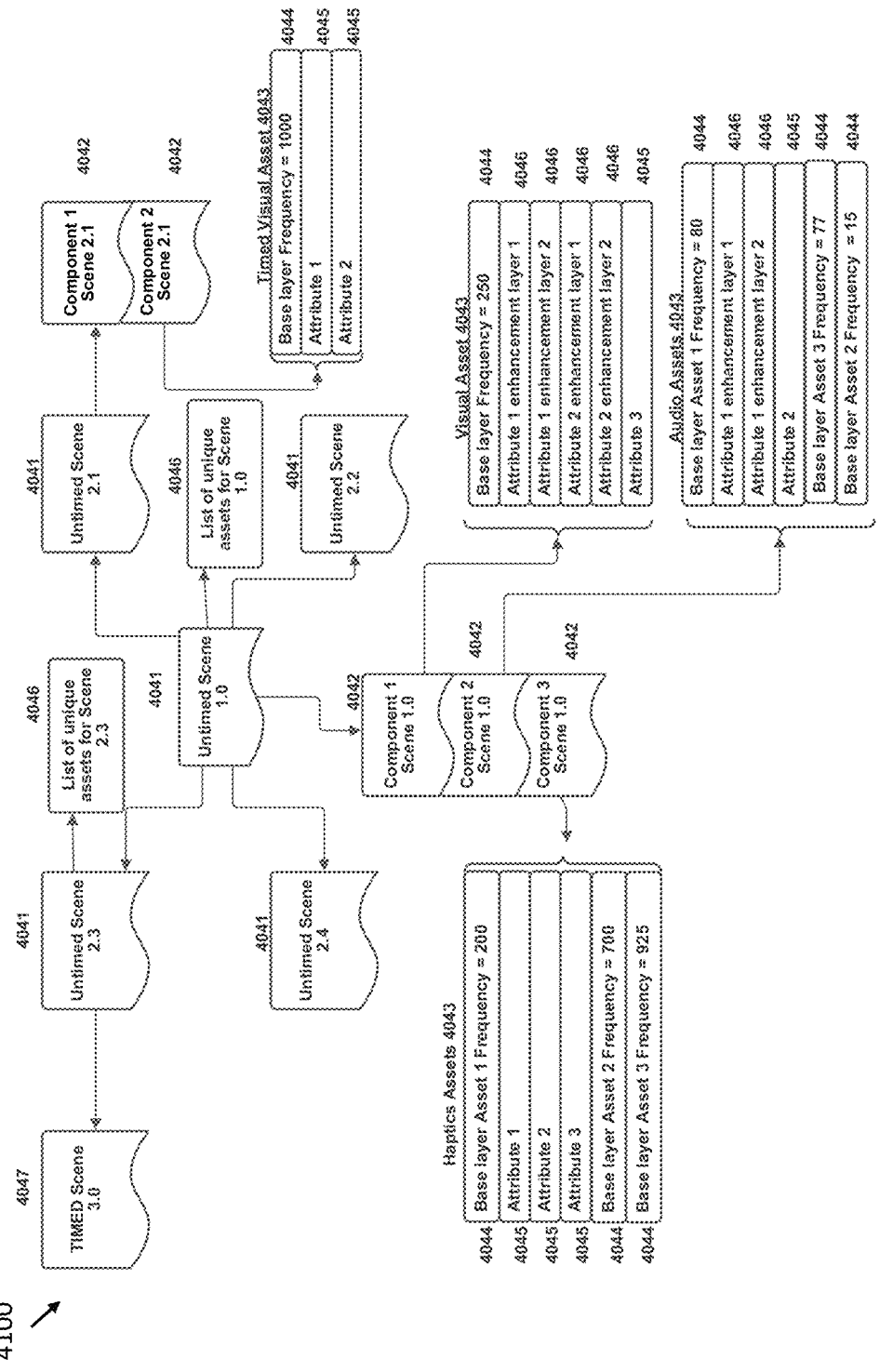
FIG. 4B is an exemplary illustration of a data model for the representation and streaming of untimed immersive media with the haptic and audio assets ordered based on increasing frequency values, according to embodiments.

FIGS. 3A-3B refer to a timed scene for timed media and FIGS. 4A-4B refer to an untimed scene for untimed media. The timed and untimed scenes may correspond to various scene representations, or scene descriptions. FIGS. 3A-3B and 4A-4B both employ a single exemplary encompassing media format that has been adapted from a source ingest media format to match the capabilities of a specific client endpoint. That is, the encompassing media format is a distribution format stream-able to a client device. The encompassing media format is robust enough in its structure to accommodate a large variety of media attributes where each may be layered based on the amount of salient information that each layer contributes to the presentation of the media.

As shown in FIG. 3A, the timed media representation 300 includes a timed scene manifest 300A that includes a list of scene information 301. Each scene information 301 refers to a list of components 302 that separately describe processing information and types of media assets that make up the scene information 301, e.g., asset lists and other processing information. The list of components 302 may refer to proxy assets 308 corresponding to the type of asset (e.g., proxy visual and audio assets, as shown in FIG. 3). The components 302 refer to a list of unique assets that have not been previously used in other scenes. For example, a list of unique assets 307 for a (timed) scene 1 is shown in FIG. 3. The components 302 also refer to assets 303 that include a base layer 304 and attribute enhancement layers 305. A base layer is a nominal representation of an asset that may be formulated to minimize the compute resources, the time needed to render the asset, and/or the time needed to transmit the asset over a network. In this exemplary embodiment, each of the base layers 304 refer to a numeric frequency metric that indicates the number of times the asset is used across the set of scenes comprising the presentation. Enhancement layers may be a set of information that when applied to the base layer representation of an asset, augment the base layer to include features or capabilities that may not supported in the base layer.

FIG. 3B depicts a timed media representation 3100 ordered by descending frequency. This timed media representation 3100 is similar to the timed media representation 300 depicted in FIG. 3A except that the assets depicted in FIG. 3B are ordered in the list by asset type and descending frequency values within each asset type. The timed scene manifest 303A includes a list of scene information 3031. Each scene information 3031 refers to a list of components 3032 that separately describe processing information and types of media assets that comprise the scene information 3031. Components 3032 refer to the assets 3033 that further refer to base layers 3034 and attribute enhancement layers 3035. In this embodiment, the base layers 3034 are ordered according to descending values for the corresponding frequency metrics. A list of unique assets that have not been previously used in other scenes is provided in 3037.

As shown in FIG. 4A, the untimed media and complexity representation 400 includes scene information 401. The scene information 401 is not associated with a start and end time/duration (according to a clock, a timer, or the like). An untimed scene manifest (not depicted) may reference a Scene 1.0 for which there is no other scene that can branch to Scene 1.0. The scene information 401 refers to a list of components 402 that separately describe processing information and types of media assets that make up the scene information 401. The components 402 refer to visual assets, audio assets, haptic assets, and timed assets (collectively referred to as assets 403). The assets 403 further refer to a base layer 404 and attribute enhancement layers 405 and 406. In this embodiment, each base layer 404 refers to a numeric frequency value that indicates the number of times that the asset is used across the set of scenes that comprise the presentation. The scene information 401 may also refer to other untimed scenes (i.e., referenced as untimed scenes 2.1-2.4 in FIG. 4A) that are for an untimed media source and/or scene information 407 that are for a timed media scene (i.e., referenced as timed scene 3.0 in FIG. 4). In the example of FIG. 4A, the untimed immersive media contains a set of five scenes (including both timed and untimed). Lists of unique assets 408 identify unique assets associated with a particular scene that have not been previously used in higher order (e.g., parent) scenes. The list of unique assets 408 shown in FIG. 4A include unique assets for an untimed scene 2.3.

FIG. 4B depicts an untimed media and ordered complexity representation 4100. An untimed scene manifest (not depicted) references a Scene 1.0 for which there is no other scene that can branch to Scene 1.0. The scene information 4041 is not associated with a start and end duration according to a clock or the like. The scene information 4041 also refers to a list of components 4042 that separately describe processing information and types of media assets that comprise scene information 4041. Components 4042 refer to assets 4043 that further refer to base layers 4044 and attribute enhancement layers 4045 and 4046. In this embodiment, each base layer 4044 refers to a numeric frequency value that indicates the number of times that the asset is used across the set of scenes that comprise the presentation. In this embodiment, the haptic assets 4043 are organized by increasing frequency values, while the audio assets 4043 are organized by decreasing frequency values. Furthermore, the scene 4041 refers to other scenes information 4041 that are for untimed media. Scene information 4041 also refers to scene information 4047 that is for a timed media scene. Lists 4046 identify unique assets associated with a particular scene that have not been previously used in higher order (e.g., parent) scenes.

The media that is streamed according to the encompassing media format is not limited to legacy visual and audio media. The encompassing media format may include any type of media information that is capable of producing a signal that interacts with machines to stimulate the human senses for sight, sound, taste, touch, and smell. As shown in FIGS. 3A-3B and 4A-4B, the media that is streamed according to the encompassing media format may be timed or untimed media, or a mixture of both. The encompassing media format is streamable by enabling a layered representation of media objects, using a base layer and enhancement layer architecture.

In some embodiments, the separate base layer and enhancement layers are computed by application of a multi-resolution or multi-tessellation analysis technique for media objects in each scene. This computation technique is not limited to raster-based visual formats.

In some embodiments, a progressive representation of a geometric object may be a multi-resolution representation of the object computed using a wavelet analysis technique.

In some embodiments, in the layered representation media format, the enhancement layers may apply different attributes to the base layer. For example, one or more of the enhancement layers may refine material properties of a surface of a visual object that is represented by the base layer.

In some embodiments, in the layered representation media format, the attributes may refine the texture of the surface of the object that is represented by the base layer by, e.g., changing the surface from a smooth to a porous texture, or from a matted surface to a glossy surface.

In some embodiments, in the layered representation media format, the surfaces of one or more visual objects in the scene may be altered from a Lambertian surface to being a ray-traceable surface.

In some embodiments, in the layered representation media format, the network may distribute the base-layer representation to the client so that the client may create a nominal presentation of the scene while the client awaits the transmission of additional enhancement layers to refine the resolution or other characteristics of the base layer.

In embodiments, the resolution of the attributes or refining information in the enhancement layers are not explicitly coupled with the resolution of the object in the base layer. Further, the encompassing media format may support any type of information media that may be presented or actuated by a presentation device or machine, thereby enabling the support of heterogeneous media formats to heterogeneous client end-points. In some embodiments, the network that distributes the media format will first query the client end-point to determine the client's capabilities. Based on the query, if the client is not capable of meaningfully ingesting the media representation, then the network may remove the layers of attributes that are not supported by the client. In some embodiments, if the client is not capable of meaningfully ingesting the media representation, the network may adapt the media from its current format into a format that is suitable for the client end-point. For example, the network may adapt the media by converting a volumetric visual media asset into a 2D representation of the same visual asset using a network-based media processing protocol. In some embodiments, the network may adapt the media by employing a neural network (NN) process to reformat the media to an appropriate format or optionally synthesize views that are needed by the client end-point.

The manifest of scenes for a complete (or partially-complete) immersive experience (live streaming event, game, or playback of on-demand asset) is organized by scenes which contain a minimal amount of information required for rendering and ingesting in order to create a presentation. The manifest of scenes includes a list of individual scenes that are to be rendered for the entirety of the immersive experience requested by the client. Associated with each scene are one or more representations of the geometric objects within the scene corresponding to the stream-able versions of the scene geometry. One embodiment of a scene may refer to a low resolution version of the geometric objects for the scene. Another embodiment of the same scene may refer to an enhancement layer for the low-resolution representation of the scene to add additional detail, or increase tessellation, of the geometric objects of the same scene. As described above, each scene may have one or more enhancement layers to increase the detail of the geometric objects of the scene in a progressive manner. Each layer of the media objects that are referenced within a scene may be associated with a token (e.g., a uniform resource identifier (URI)) that points to the address of where the resource can be accessed within the network. Such resources are analogous to content delivery networks (CDN) where the content may be fetched by the client. The token for a representation of a geometric object may point to a location within the network or to a location within the client. That is, the client may signal to the network that its resources are available to the network for network-based media processing.

According to embodiments, a scene (timed or untimed) may correspond to a scene graph as a Multi-Plane Image (MPI) or as a Multi-Spherical Image (MSI). Both the MPI and MSI techniques are examples of technologies that aid in the creation of display-agnostic scene representations for natural content (i.e., images of the real world captured simultaneously from one or more cameras). Scene graph technologies, on the other hand, may be employed to represent both natural and computer-generated imagery in the form of synthetic representations. However, such representations are especially compute-intensive to create for cases where the content is captured as natural scenes by one or more cameras. Scene graph representations of naturally-captured content are both time and computation intensive to create, requiring complex analysis of natural images with techniques of photogrammetry or deep learning or both, in order to create synthetic representations that can subsequently be used to interpolate sufficient and adequate numbers of views to fill a target immersive client display's viewing frustum. As a result, such synthetic representations are impractical to consider as candidates for representing natural content because they cannot practically be created in real-time for consideration of use cases that require real-time distribution. As such, the best representations for computer generated imagery is to employ the use of a scene graph with synthetic models, because computer generated imagery is created using 3D modeling processes and tools, employing the use of a scene graph with synthetic models results in the best representations for computer generated imagery.

Figure 5:
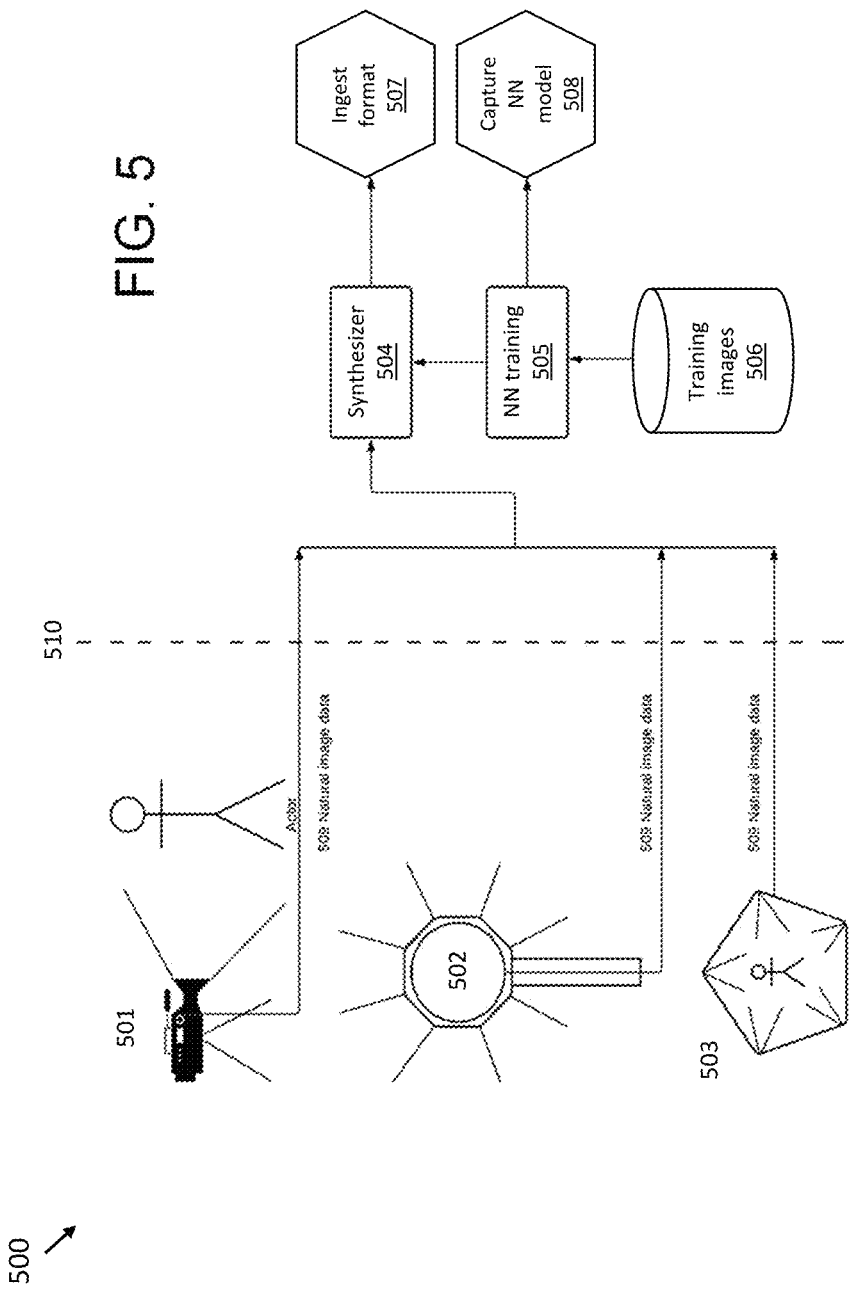
FIG. 5 is an exemplary workflow illustrating natural media synthesis, according to embodiments.

FIG. 5 illustrates an example of a natural media synthesis process 500, according to embodiments. The natural media synthesis process 500 converts an ingest format from a natural scene to a representation that can be used as an ingest format for a network that serves heterogeneous client end-points. The left side of the dashed line 510 is the content capturing portion of the natural media synthesis process 500. The right side of the dashed line 510 is the ingest format synthesis (for natural images) of the natural media synthesis process 500.

As shown in FIG. 5, a first camera 501 uses a single camera lens to capture a scene of, for example, a person (i.e., the actor shown in FIG. 5). A second camera 502 captures a scene with five diverging fields of view by mounting five camera lenses around a ring-shaped object. The arrangement of the second camera 502 shown in FIG. 5 is an exemplary arrangement commonly used to capture omnidirectional content for VR applications. A third camera 503 captures a scene with seven converging fields of view by mounting seven camera lenses on the inner diameter portion of a sphere. The arrangement of the third camera 503 is an exemplary arrangement commonly used to capture light fields for light field or holographic immersive displays. Embodiments are not limited to configurations shown in FIG. 5. The second camera 502 and the third camera 503 may include a plurality of camera lenses.

Natural image content 509 is output from the first camera 501, the second camera 502, and the third camera 503 and serve as input to a synthesizer 504. The synthesizer 504 may employ a NN training 505 using a collection of training images 506 to produce a capture NN model 508. The training images 506 may be pre-defined or stored from a previous synthesis processing. A NN model (for example, the capture NN model 508) is a collection of parameters and tensors (e.g., matrices) that define weights (i.e., numerical values) used in well-defined mathematical operations applied to a visual signal to arrive at an improved visual output which may include the interpolation of new views for the visual signal that were not explicitly provided by the original signal.

In some embodiments, a photogrammetry process may be implemented in lieu of the NN training 505. If the capture NN model 508 is created during the natural media synthesis process 500, then the capture NN model 508 becomes one of the assets in the ingest format 507 for the natural media content. The ingest format 507 may be, for example, a MPI or a MSI. The ingest format 507 may also include media assets.

Figure 6:
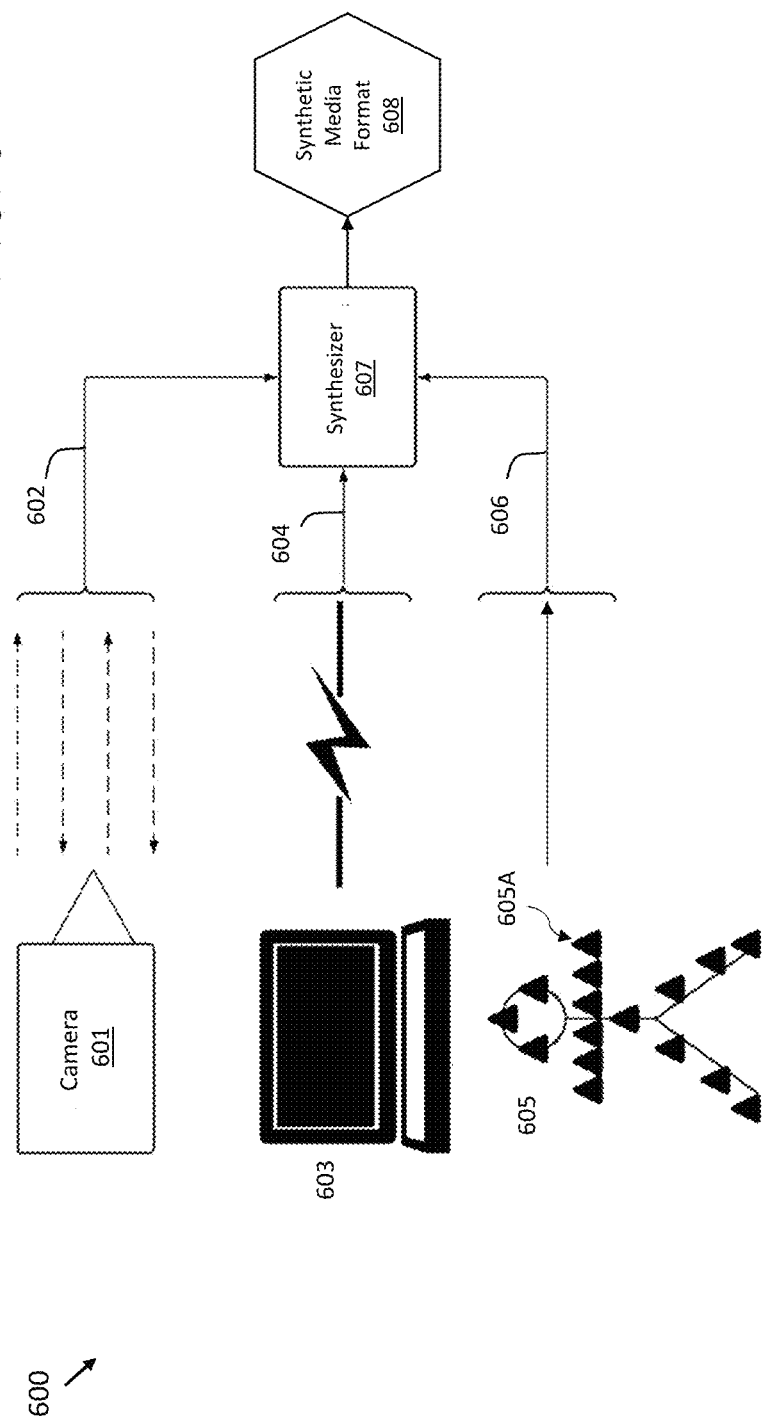
FIG. 6 is an exemplary workflow illustrating synthetic media ingest creation, according to embodiments.

FIG. 6 illustrates an example of a synthetic media ingest creation process 600, according to embodiments. The synthetic media ingest creation process 600 creates an ingest media format for synthetic media such as, e.g., computer-generated imagery.

As shown in FIG. 6, a camera 601 may capture point clouds 602 of a scene. The camera 601 may be, for example, a LIDAR camera. A computer 603 employs, for example, common gateway interface (CGI) tools, 3D modelling tools, or another animation processes to create synthetic content (i.e., a representation of a synthetic scene that can be used as an ingest format for a network that serves heterogeneous client end-points). The computer 603 may create CGI assets 604 over a network. Additionally, sensors 605A may be worn on an actor 605 in a scene. The sensors 605A may be, for example, a motion capture suit with sensors attached. The sensors 605A capture a digital recording of the motion of the actor 605 to produce animated motion data 606 (or MoCap Data). The data from the point clouds 602, the CGI assets 604, and the motion data 606 are provided as input to synthesizer 607 which creates the synthetic media ingest format 608. In some embodiments, the synthesizer 607 may use a NN and training data to create a NN model to generate the synthetic media ingest format 608.

Both natural and computer generated (i.e., synthetic) content may be stored in a container. The container may include a serialized format to store and exchange information to represent all natural, all synthetic, or a mixture of synthetic and natural scenes including a scene graph and all of the media resources that are required for rendering of the scene. The serialization process of the content includes translating data structures or an object state into a format that can be stored (e.g., in a file or a memory buffer) or transmitted (e.g., across a network connection link) and reconstructed later in a same or different computer environment. When the resulting series of bits is reread according to the serialization format, it can be used to create a semantically identical clone of the original object.

The dichotomy in optimal representations of both natural and computer generated (i.e., synthetic) content suggests that the optimal ingest format for naturally-captured content is different from the optimal ingest format for computer generated content or for natural content that is not essential for real-time distribution applications. Therefore, according to embodiments, the network targets to be robust enough to support multiple ingest formats for visually immersive media, whether they are created naturally through the use of, e.g., physical cameras or by a computer.

Technologies such as ORBX by OTOY, Universal Scene Description by Pixar, and Graphics Language Transmission Format 2.0 (glTF2.0) specification written by the Khronos 3D Group embody scene graphs as a format suitable for representing visual immersive media that is created using computer generated techniques, or naturally captured content for which deep learning or photogrammetry techniques are employed to create the corresponding synthetic representations of a natural scene (i.e., not essential for real-time distribution applications).

ORBX by OTOY is one of several scene graph technologies that is able to support any type of visual media, timed or untimed, including ray-traceable, legacy (frame-based), volumetric, and other types of synthetic or vector-based visual formats. ORBX is unique from other scene graphs because ORBX provides native support for freely available and/or open source formats for meshes, point clouds, and textures. ORBX is a scene graph that has been intentionally designed with the goal of facilitating interchange across multiple vendor technologies that operate on scene graphs. Moreover, ORBX provides a rich materials system, support for Open Shader Language, a robust camera system, and support for Lua Scripts. ORBX is also the basis of the Immersive Technologies Media Format published for license under royalty-free terms by the Immersive Digital Experiences Alliance (IDEA). In the context of real time distribution of media, the ability to create and distribute an ORBX representation of a natural scene is a function of the availability of compute resources to perform a complex analysis of the camera-captured data and synthesis of the same data into synthetic representations.

USD by Pixar is a scene graph that is popularly used in visual effects and professional content production. USD is integrated into the Nvidia's Omniverse platform which is a set of tools for developers for 3D model creation and rendering with Nvidia's graphic processing units (GPU). A subset of USD, published by Apple and Pixar, is referred to as USDZ which is supported by Apple's ARKit.

The glTF2.0 is a version of the Graphics Language Transmission Format specification written by the Khronos 3D Group. This format supports a simple scene graph format that is generally capable of supporting static (untimed) objects in scenes, including PNG and JPEG image formats. The glTF2.0 supports simple animations, including support for translate, rotate, and scale of basic shapes described using the glTF primitives (i.e., for geometric objects). The glTF2.0 does not support timed media, and hence does not support video nor audio media inputs.

These designs for scene representations of immersive visual media are provided for example only, and do not limit the disclosed subject matter in its ability to specify a process to adapt an input immersive media source into a format that is suitable to the specific characteristics of a client end-point device. Moreover, any or all of the above example media representations either employ or may employ deep learning techniques to train and create a NN model that enables or facilitates the selection of specific views to fill a particular display's viewing frustum based on the specific dimensions of the frustum. The views that are chosen for the particular display's viewing frustum may be interpolated from existing views that are explicitly provided in the scene representation, e.g., from the MSI or MPI techniques. The view may also be directly rendered from render engines based on specific virtual camera locations, filters, or descriptions of virtual cameras for these render engines.

The methods and devices of the present disclosure are robust enough to consider that there is a relatively small but well known set of immersive media ingest formats that are sufficiently capable of satisfying requirements for real-time or on-demand (e.g., non-real-time) distribution of media that is either captured naturally (e.g., with one or more cameras) or created using computer generated techniques.

Interpolation of views from an immersive media ingest format by use of either NN models or network-based rendering engines are further facilitated as advanced network technologies (e.g., 5G for mobile networks), and fiber optical cables are deployed for fixed networks. These advanced network technologies increase the capacity and capabilities of commercial networks because such advanced network infrastructures can support transport and delivery of increasingly larger amounts of visual information. Network infrastructure management technologies such as Multi-access Edge Computing (MEC), Software Defined Networks (SDN), and Network Functions Virtualization (NFV) enable commercial network service providers to flexibly configure their network infrastructure to adapt to changes in demand for certain network resources, e.g., to respond to dynamic increases or decreases in demand for network throughputs, network speeds, roundtrip latency, and computational resources. Moreover, this inherent ability to adapt to dynamic network requirements likewise facilitates the ability of networks to adapt immersive media ingest formats to suitable distribution formats in order to support a variety of immersive media applications with potentially heterogeneous visual media formats for heterogeneous client endpoints.

Immersive Media applications themselves may also have varying requirements for network resources including gaming applications which require significantly lower network latencies to respond to real-time updates in the state of the game, telepresence applications which have symmetric throughput requirements for both the uplink and downlink portions of the network, and passive viewing applications that may have increased demand for downlink resources depending on the type of client end-point display that is consuming the data. In general, any consumer-facing application may be supported by a variety of client end-points with various onboard-client capabilities for storage, compute, and power, and likewise various requirements for particular media representations.

Therefore, embodiments of the present disclosure enable a sufficiently equipped network, i.e., a network that employs some or all of the characteristics of a modem network, to simultaneously support a plurality of legacy and immersive media-capable devices according to features that are specified within the device. As such, the immersive media distribution methods and processes described herein provide flexibility to leverage media ingest formats that are practical for both real-time and on demand use cases for the distribution of media, flexibility to support both natural and computer-generated content for both legacy and immersive-media capable client end-points, and support for both timed and untimed media. The methods and processes also dynamically adapt a source media ingest format to a suitable distribution format based on the features and capabilities of the client end-point, as well as based on the requirements of the application. This ensure that the distribution format is streamable over IP-based networks and enables the network to simultaneously serve a plurality of heterogeneous client end-points that may include both legacy and immersive media-capable devices. Further, embodiments provide an exemplary media representation framework that facilitates the organization of distribution media along scene boundaries.

An end-to-end implementation of the heterogeneous immersive media distribution according to embodiments of the present disclosure, providing the aforementioned improvements, are achieved according to the processing and components described in the detailed description of FIGS. 7-14, further detailed below.

Figure 7:
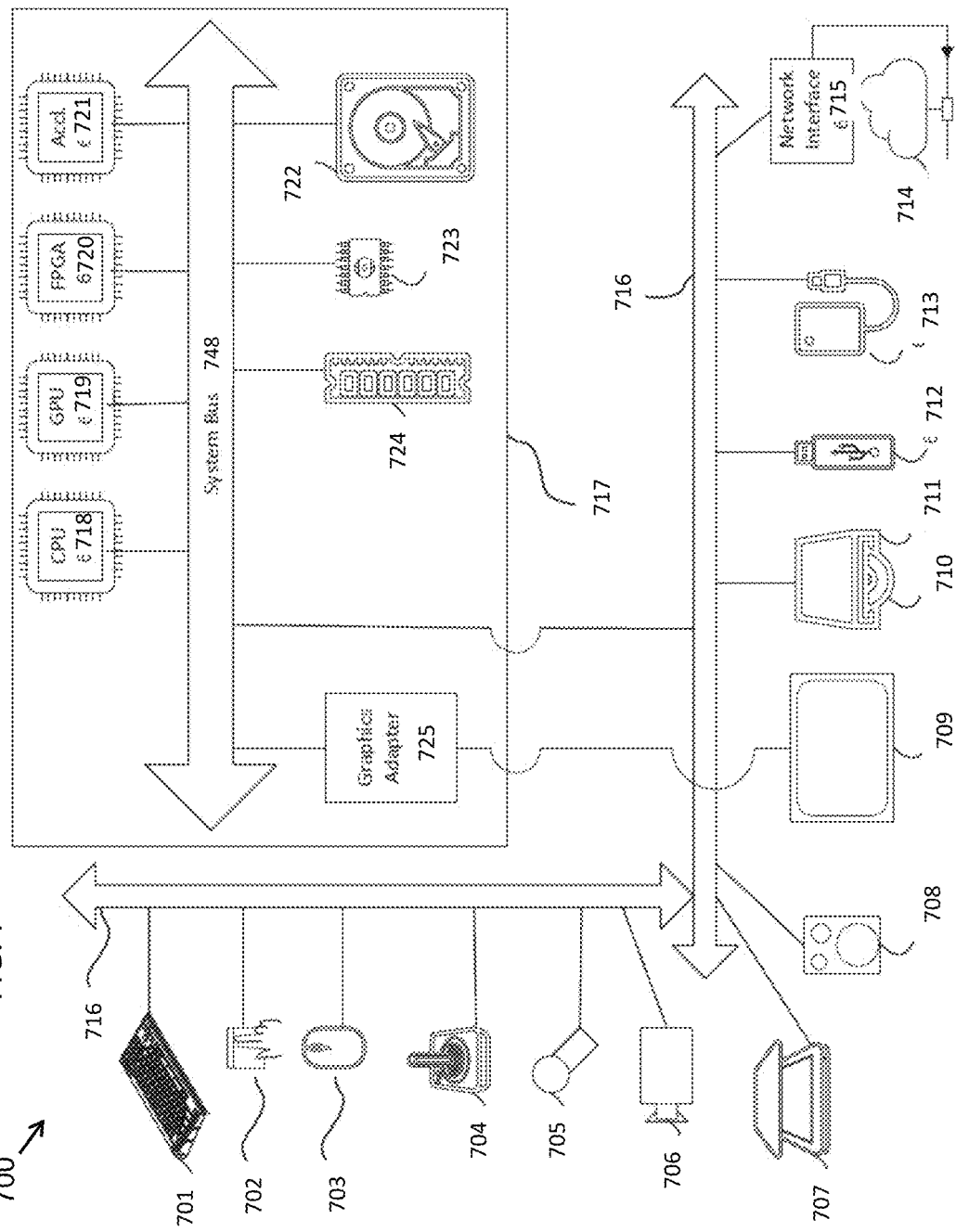
FIG. 7 is an exemplary illustration of a computer system, according to embodiments.

The techniques for representing and streaming heterogeneous immersive media, described above, may be implemented in both sources and destinations as computer software using computer-readable instructions and physically stored in one or more non-transitory computer-readable media or by a specifically configured one or more hardware processors. FIG. 7 shows a computer system 700 suitable for implementing certain embodiments of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as keystrokes, swipes, data glove movements), audio input (such as voice, clapping), visual input (such as gestures), olfactory input. The human interface devices may also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 701, trackpad 702, mouse 703, screen 709, which may be for example a touch-screen, data-glove, joystick 704, microphone 705, camera 706, and scanner 707.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the screen 709, data-glove, or joystick 704, but there may also be tactile feedback devices that do not serve as input devices), audio output devices (such as: speakers 708, headphones), visual output devices (such as screens 709 to include CRT screens, LCD screens, plasma screens, OLED screens, each with or without touch-screen input capability, each with or without tactile feedback capability-some of which may be capable to output two-dimensional visual output or more than three-dimensional output through means such as stereographic output; virtual-reality glasses, holographic displays and smoke tanks), and printers.

Computer system 700 may also include human accessible storage devices and their associated media such as optical media including CD/DVD ROM/RW 711 with CD/DVD or the like media 710, thumb-drive 712, removable hard drive or solid-state drive 713, legacy magnetic media such as tape and floppy disc, specialized ROM/ASIC/PLD based devices such as security dongles, and the like.

Those skilled in the art should also understand that term "computer-readable media" as used in connection with the presently disclosed subject matter does not encompass transmission media, carrier waves, or other transitory signals.

Computer system 700 may also include a bi-directional interface 715 to one or more communication networks 714. Networks 714 may, for example, be wireless, wireline, optical. Networks 714 may further be local, wide-area, metropolitan, vehicular and industrial, real-time, delay-tolerant, and so on. Examples of networks 714 include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks 714 commonly require external network interface adapters (e.g., graphics adapter 725) that attached to certain general-purpose data ports or peripheral buses 716 (such as, for example, USB ports of the computer system 700; others are commonly integrated into the core of the computer system 700 by attachment to a system bus 748 as described below (for example Ethernet interface into a PC computer system or cellular network interface into a smartphone computer system). Using any of these networks 714, computer system 700 may communicate with other entities. Such communication may be uni-directional, receive only (for example, broadcast TV), uni-directional send-only (for example, CANbus to certain CANbus devices), or bi-directional, for example to other computer systems using local or wide area digital networks. Certain protocols and protocol stacks may be used on each of those networks and network interfaces, as described above.

The aforementioned human interface devices, human-accessible storage devices, and network interfaces may be attached to a core 717 of the computer system 700.

The core 717 may include one or more Central Processing Units (CPU) 718, Graphics Processing Units (GPU) 719, specialized programmable processing units in the form of Field Programmable Gate Areas (FPGA) 720, hardware accelerators 721 for certain tasks, and so forth. These devices, along with Read-only memory (ROM) 723, Random-access memory (RAM) 724, internal mass storage such as internal non-user accessible hard drives, SSDs, and the like 722, may be connected through a system bus 748. In some computer systems, the system bus 748 may be accessible in the form of one or more physical plugs to enable extensions by additional CPUs, GPU, and the like. The peripheral devices may be attached either directly to the core's system bus 748, or through a peripheral bus 716. Architectures for a peripheral bus include PCI, USB, and the like.

CPUs 718, GPUs 719, FPGAs 720, and accelerators 721 may execute certain instructions that, in combination, may make up the aforementioned machine code (or computer code). That computer code may be stored in ROM 723 or RAM 724. Transitional data may also be stored in RAM 724, whereas permanent data may be stored, for example, in the internal mass storage 722. Fast storage and retrieval to any of the memory devices may be enabled through the use of cache memory, which may be closely associated with one or more CPU 718, GPU 719, mass storage 722, ROM 723, RAM 724 and the like.

The computer-readable media may have computer code thereon for performing various computer-implemented operations. The media and computer code may be specially designed and constructed for the purposes of the present disclosure, or they may be of the kind well known and available to those having skill in the computer software arts.

As an example, and not by way of limitation, a computer system having the architecture of computer system 700, and specifically the core 717 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 717 that are of non-transitory nature, such as core-internal mass storage 722 or ROM 723. The software implementing various embodiments of the present disclosure may be stored in such devices and executed by core 717. A computer-readable medium may include one or more memory devices or chips, according to particular needs. The software may cause the core 717 and specifically the processors therein (including CPU, GPU, FPGA, and the like) to execute particular processes or particular parts of particular processes described herein, including defining data structures stored in RAM 724 and modifying such data structures according to the processes defined by the software. In addition or as an alternative, the computer system may provide functionality as a result of logic hardwired or otherwise embodied in a circuit (for example, accelerator 721), which may operate in place of or together with software to execute particular processes or particular parts of particular processes described herein. Reference to software may encompass logic, and vice versa, where appropriate.

Reference to a computer-readable media may encompass a circuit (such as an integrated circuit (IC)) storing software for execution, a circuit embodying logic for execution, or both, where appropriate. The present disclosure encompasses any suitable combination of hardware and software.

The number and arrangement of components shown in FIG. 7 are provided as an example. In practice, the input human interface devices may include additional components, fewer components, different components, or differently arranged components than those shown in FIG. 7. Additionally, or alternatively, a set of components (e.g., one or more components) of the input human interface devices may perform one or more functions described as being performed by another set of components of the input human interface devices.

In embodiments, any one of the operations or processes of FIGS. 1-6 and FIGS. 8-15 may be implemented by or using any one of the elements illustrated in FIG. 7.

Figure 8:
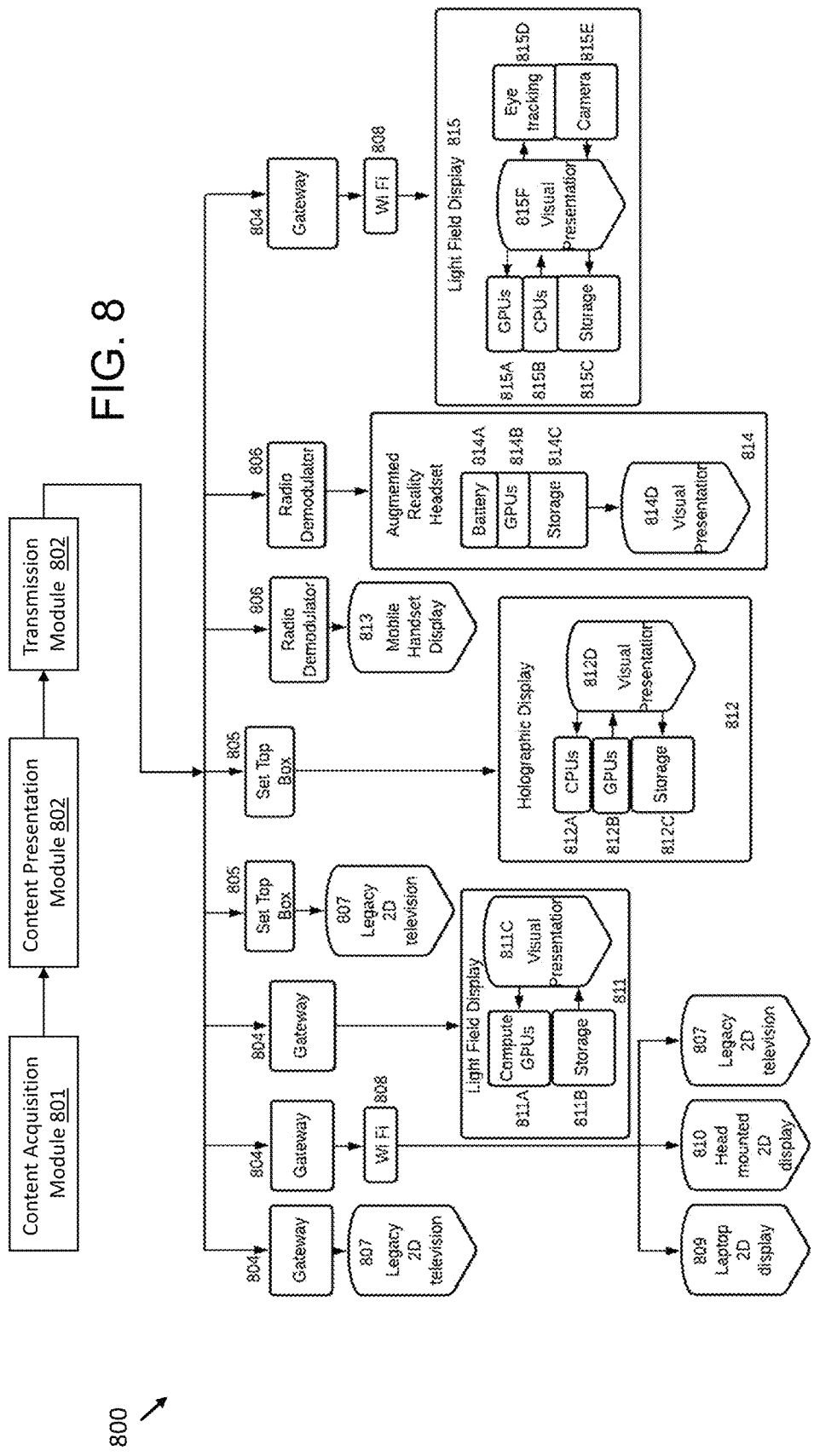
FIG. 8 is an exemplary illustration of a network media distribution system, according to embodiments.

FIG. 8 illustrates an exemplary network media distribution system 800 that serves a plurality of heterogeneous client endpoints. That is, the system 800 supports a variety of legacy and heterogeneous immersive-media capable displays as client end-points. The system 800 may include a content acquisition module 801, a content preparation module 802, and a transmission module 803.

The content acquisition module 801 captures or creates source media using, for example, embodiments described in FIG. 6 and/or FIG. 5. The content preparation module 802 creates ingest formats which are then transmitted to a network media distribution system using the transmission module 803. Gateways 804 may serve customer premise equipment to provide network access to various client end-points for the network. Set top boxes 805 may also serve as customer premise equipment to provide access to aggregated content by the network service provider. Radio demodulators 806 may serve as mobile network access points for mobile devices, e.g., as shown with mobile handset display 813. In this particular embodiment of system 800, Legacy 2D Televisions 807 are shown to be directly connected to one of the gateways 804, Set Top Box 805, or Wi-Fi (router) 808. A laptop 2D display 809 (i.e., a computer or laptop with a legacy 2D display) is illustrated as a client end-point connected to Wi-Fi (router) 808. A head mounted 2D (raster-based) display 810 is also connected to the Wi-Fi (router) 808. A lenticular light field display 811 is shown connected to one of the gateways 804. The lenticular light field display 811 may include one or more GPUs 811A, a storage device 811B, and a visual presentation component 811C that creates multiple views using a ray-based lenticular optical technology. A holographic display 812 is shown connected to a set top box 805. The holographic display 812 may include one or more CPUs 812A, GPUs 812B, a storage device 812C, and a visualization component 812D. The visualization component 812D may be a Fresnel pattern, wave based holographic device/display. An augmented reality (AR) headset 814 is shown connected to the radio demodulator 806. The AR headset 814 may include a GPU 814A, a storage device 814B, a battery 814C, and a volumetric visual presentation component 814D. A dense light field display 815 is shown as connected to a Wi-Fi (router) 808. The dense light field display 815 may include one or more GPUs 815A, CPUs 815B, storage device 815C, an eye tracking device 815D, camera 815E, and a dense ray-based light field panel 815F.

The number and arrangement of components shown in FIG. 8 are provided as an example. In practice, the system 800 may include additional components, fewer components, different components, or differently arranged components than those shown in FIG. 8. Additionally, or alternatively, a set of components (e.g., one or more components) of the system 800 may perform one or more functions described as being performed by another set of components of the device or respective displays.

Figure 9:
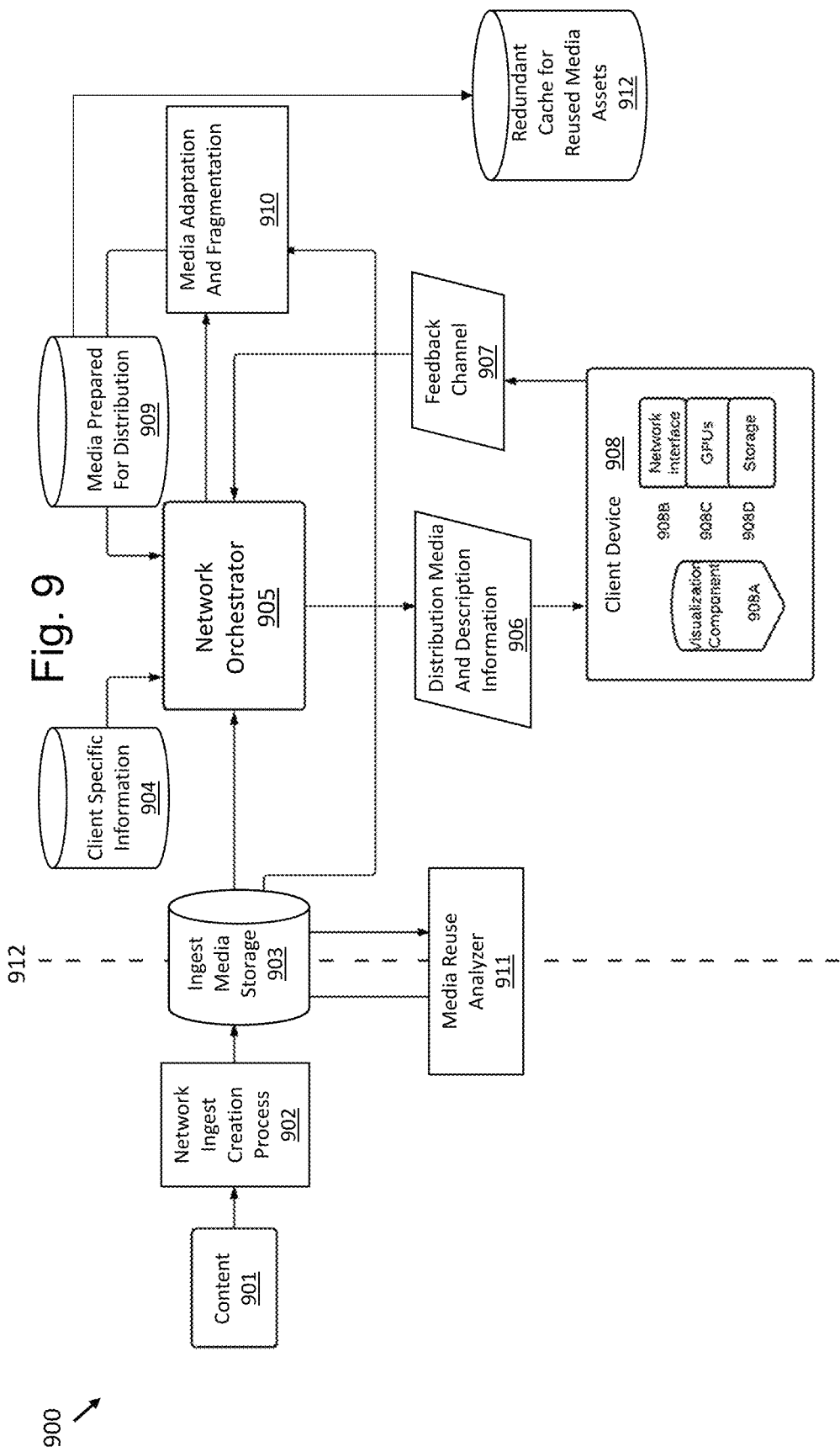
FIG. 9 is an exemplary workflow illustrating immersive media distribution using redundant cache, according to embodiments.

FIG. 9 illustrates an exemplary workflow of an immersive media distribution process 900 that is capable of serving legacy and heterogeneous immersive media-capable displays as previously depicted in FIG. 8. The immersive media distribution process 900, performed by a network, may provide adaptation information about the specific media represented in the media ingest format, e.g., prior to the network's process of adapting the media for consumption (as described with reference to FIG. 10) by a specific immersive media client endpoint.

The immersive media distribution process 900 may be broken up into two parts: immersive media production on the left side of the dashed line 912 and immersive media network distribution on the right side of the dashed line 912. The immersive media production and immersive media network distribution may be performed by the network or the client device.

Media content 901 is either created or acquired by the network (or client device) or from a content source, respectively. Methods for creating or acquiring data may correspond to FIG. 5 and FIG. 6 for natural and synthetic content, respectively. The created content 901 is then converted into an ingest format using a network ingest format creation process 902. The network ingest format creation process 902 may also correspond to FIG. 5 and FIG. 6 for natural and synthetic content, respectively. The ingest format may also be updated to store information regarding assets that are potentially reused across multiple scenes from, for example, a media reuse analyser 911 (detailed later with reference to FIG. 10 and FIG. 14A). The ingest format is transmitted to the network and stored in a ingest media storage 903 (i.e., a storage device). In some embodiments, the storage device may be in the immersive media content producer's network and accessed remotely for the immersive media network distribution 920. Client and application specific information is optionally available in a remote storage device, client specific information 904. In some embodiments, the client specific information 904 may exist remotely in an alternate cloud network and may be transmitted to the network.

A network orchestrator 905 is then performed. The network orchestration serves as the primary source and sink of information to execute major tasks of the network. The network orchestrator 905 may be implemented in unified format with other components of the network. The network orchestrator 905 may be a process that further employ a bi-directional message protocol with the client device to facilitate all processing and distribution of the media in accordance with the characteristics of the client device. Furthermore, the bi-directional protocol may be implemented across different delivery channels (e.g., a control plane channel and/or a data plane channel).

As shown in FIG. 9, the network orchestrator 905 receives information about the features and attributes of a client device 908. The network orchestrator 905 collects requirements regarding the application currently running on the client device 908. This information may be obtained from the client specific information 904. In some embodiments, the information may be obtained by directly querying the client device 908. When the client device is directly queried, a bi-directional protocol is assumed to be present and operational so that the client device 908 may communicate directly to with the network orchestrator 905.

Figure 10:
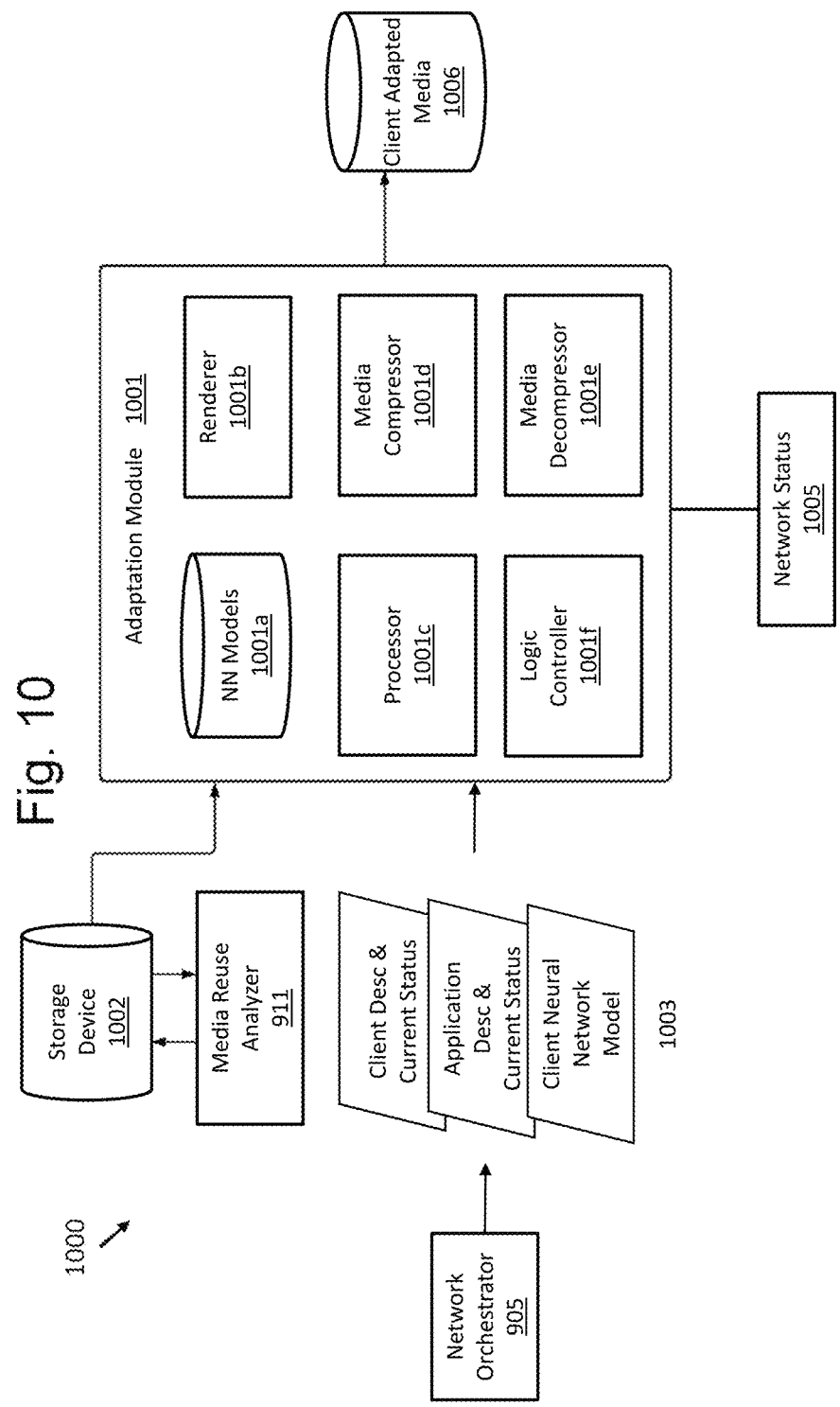
FIG. 10 is a system diagram of a media adaptation process system, according to embodiments.

The network orchestrator 905 may also initiates and communicates with a media adaptation and fragmentation module 910 (which is described in FIG. 10). As ingest media is adapted and fragmented by the media adaptation and fragmentation module 910, the media may be transferred to an intermedia storage device such as a media prepared for distribution 909. If the network is designed to include a cache for assets that are used multiple times in the context of a presentation, then another intermedia storage device redundant cache for reused media assets 912 may be utilized to serve as a cache for such assets. As the distribution media is prepared and stored in media prepared for distribution 909 storage device, the network orchestrator 905 ensures that the client device 908 either receives the distribution media and descriptive information 906 either through a "push" request, or the client device 908 may initiate a "pull" request of the distribution media and descriptive information 906 from the stored media prepared for distribution 909. The information may be "pushed" or "pulled" via a network interface 908B of the client device 908. The "pushed" or "pulled" distribution media and descriptive information 906 may be description information that corresponds to the distribution media.

In some embodiments, the network orchestrator 905 employs a bi-directional message interface to perform the "push" request or to initiate a "pull" request by the client device 908. The client device 908 may optionally employ GPUs 908C (or CPUs).

The distribution media format is then stored in storage device or storage cache 908D included in the client device 908. Finally, the client device 908 visually presents the media via a visualization component 908A.

Throughout the process of streaming the immersive media to the client device 908, the network orchestrator 905 monitors the status of the client's progress via a client progress and status feedback channel 907. In some embodiments, the monitoring of the status may be performed through a bi-directional communication message interface.

FIG. 10 illustrates an example of a media adaptation process 1000 performed by, e.g., the media adaptation and fragmentation module 910. By performing the media adaptation process 1000, the ingested source media may be appropriately adapted to match the requirements of the client (e.g., the client device 908).

As shown in FIG. 10, the media adaptation process 1000 includes multiple components that facilitate the adaptation of the ingest media into an appropriate distribution format for the client device 908. The components illustrated in FIG. 10 should be regarded as exemplary. In practice, the media adaptation process 1000 may include additional components, fewer components, different components, or differently arranged components than those shown in FIG. 10. Additionally, or alternatively, a set of components (e.g., one or more components) of the media adaptation process 1000 may perform one or more functions described as being performed by another set of components.

In FIG. 10, an adaptation module 1001 receives input a network status 1005 to track the current traffic load on the network. As mentioned, the adaptation module 1001 also receives information from the network orchestrator 905. The information may include attributes and features descriptions of the client device 908, application features and descriptions, the current status of the application, and a client NN model (if available) to aid in mapping the geometry of the client's frustum to the interpolation capabilities of the ingest immersive media. Such information may be obtained by means of a bi-directional message interface. The adaptation module 1001 ensures that the adapted output, as it is created, is stored into a storage device for storing client adapted media 1006.

A media reuse analyzer 911 may be an optional process that may be executed a priori or as part of the network automated process for the distribution of the media. The media reuse analyzer 911 may store the ingest media format and assets in a storage device (1002). The ingest media format and assets may then be transmitted to the adaptation module 1001 from the storage device (1002).

The adaptation module 1001 may be controlled by a logic controller 1001F. The adaptation module 1001 may also employ a renderer 1001B or a processor 1001C to adapt the specific ingest source media to a format that is suitable for the client. The processor 1001C may be NN-based processor. The processor 1001C uses NN Models 1001A. Examples of such a processor 1001C include the Deepview NN model generator as described in MPI and MSI. If the media is in a 2D format, but the client must have a 3D format, then the processor 1001C may invoke a process to use highly correlated images from a 2D video signal to derive a volumetric representation of the scene depicted in the media.

The renderer 1001B may be a software-based (or hardware-based) application or process, based on a selective mixture of disciplines related to: acoustic physics, light physics, visual perception, audio perception, mathematics, and software development, that, given an input scene graph and asset container, emits a (typically) visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g., repackaged into another container and used in a series of rendering processes in a graphics pipeline). For audio-based media assets, a renderer may emit an audio signal for presentation in a multi-channel loudspeaker and/or binauralized headphones, or for repackaging into another (output) container. Renderers include, for example, real-time rendering features of source and cross-platform game engines. A renderer may include scripting language (i.e., an interpreted programming language) that may be executed by the renderer at runtime to process dynamic input and variable state changes made to the scene graph nodes. The dynamic input and variable state changes may affect rendering and evaluation of spatial and temporal object topology (including physical forces, constraints, inverse kinematics, deformation, collisions), and energy propagation and transport (light, sound). Evaluation of the spatial and temporal object topology produces a result (e.g., similar to evaluation of a document object model for a webpage) that causes the output to move from an abstract to a concrete result.

The renderer 1001B may be, for example, a modified version of the OTOY Octane renderer which would be modified to interact directly with the adaptation module 1001. In some embodiments, the renderer 1001B implements a computer graphics method (e.g., path tracing) of rendering three-dimensional scenes such that the illumination of the scene is faithful to reality. in some embodiments, the renderer 1001B may employ a shader (i.e., a type of computer program that was originally used for shading (the production of appropriate levels of light, darkness, and color within an image), but which now performs a variety of specialized functions in various fields of computer graphics special effects, video post-processing unrelated to shading, and other functions unrelated to graphics).

The adaptation module 1001 may perform compression and decompression of the media content using a media compressor 1001D and media decompressor 1001E, respectively, depending on the need for compression and decompression based on the format of the ingest media and the format required by the client device 908. The media compressor 1001D may be a media encoder and the media decompressor 1001E may be a media decoder. After performing the compression and decompression (if necessary), the adaptation module 1001 outputs client adapted media 1006 which is optimal for streaming or distribution to the client device 908. The client adapted media 1006 may be stored in a storage device for storing the adapted media.

Figure 11A:
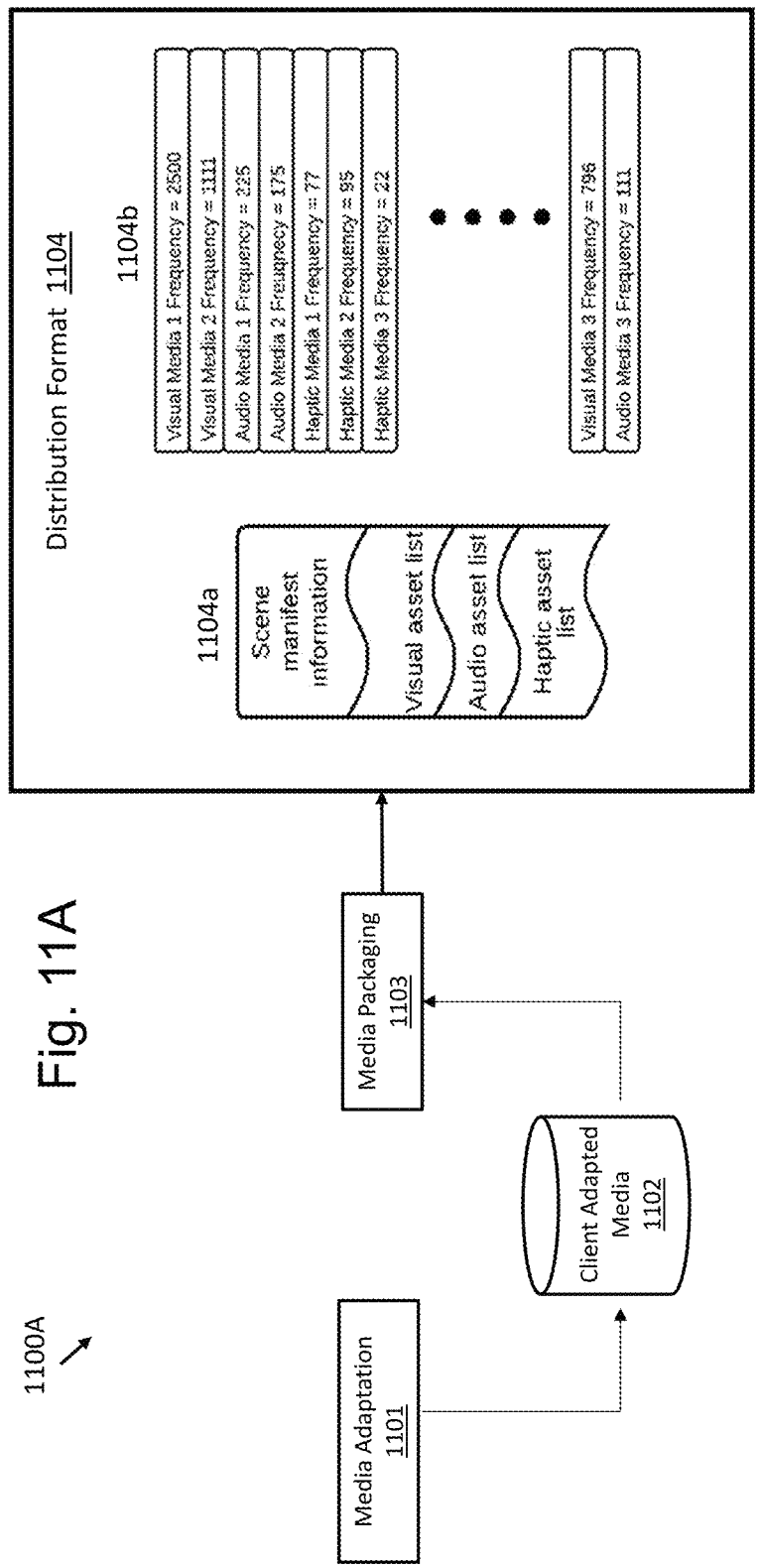
FIG. 11A is an exemplary workflow illustrating creation of media in the distribution format, according to embodiments.

FIG. 11 illustrates an exemplary distribution format creation process 1100. As shown in FIG. 11, the distribution format creation process 1100 includes a media adaptation module 1101 and an adapted media packaging module 1103 that packages media output from the media adaptation process 1000 and stored as the client adapted media 1006. The media packaging module 1103 formats the adapted media from the client adapted media 1006 into a robust distribution format 1104. The distribution format may be, for example, the exemplary formats shown in FIGS. 3A-3B or FIGS. 4A-4B. An information manifest 1104A may provide the client device 908 with a list of scene data assets 1104B. The list of scene data assets 1104B may also include metadata describing the frequency by each asset is used across the set of scenes comprising the presentation. The list of scene data assets 1104B depicts a list of visual assets, audio assets, and haptic assets, each with their corresponding metadata. In this exemplary embodiment, each of the assets in list of scene data assets 1104B references metadata that contains a numeric frequency value that indicates the number of times that a particular asset is used across all scenes that comprise the presentation.

The media may further be packetized before steaming. FIG. 12 illustrates an exemplary packetizing process 1200. The packetizing system 1200 includes, a packetizer 1202. The packetizer 1202 may receive the list of scene data assets 1104B (or 11044B) as input media 1201 (as shown in FIG. 12). In some embodiments, the client adapted media 1006 or the distribution format 1104 are input to the packetizer 1202. The packetizer 1202 separates the input media 1201 into individual packets 1203 suitable for representation and streaming to the client device 908 on the network.

Figure 13:
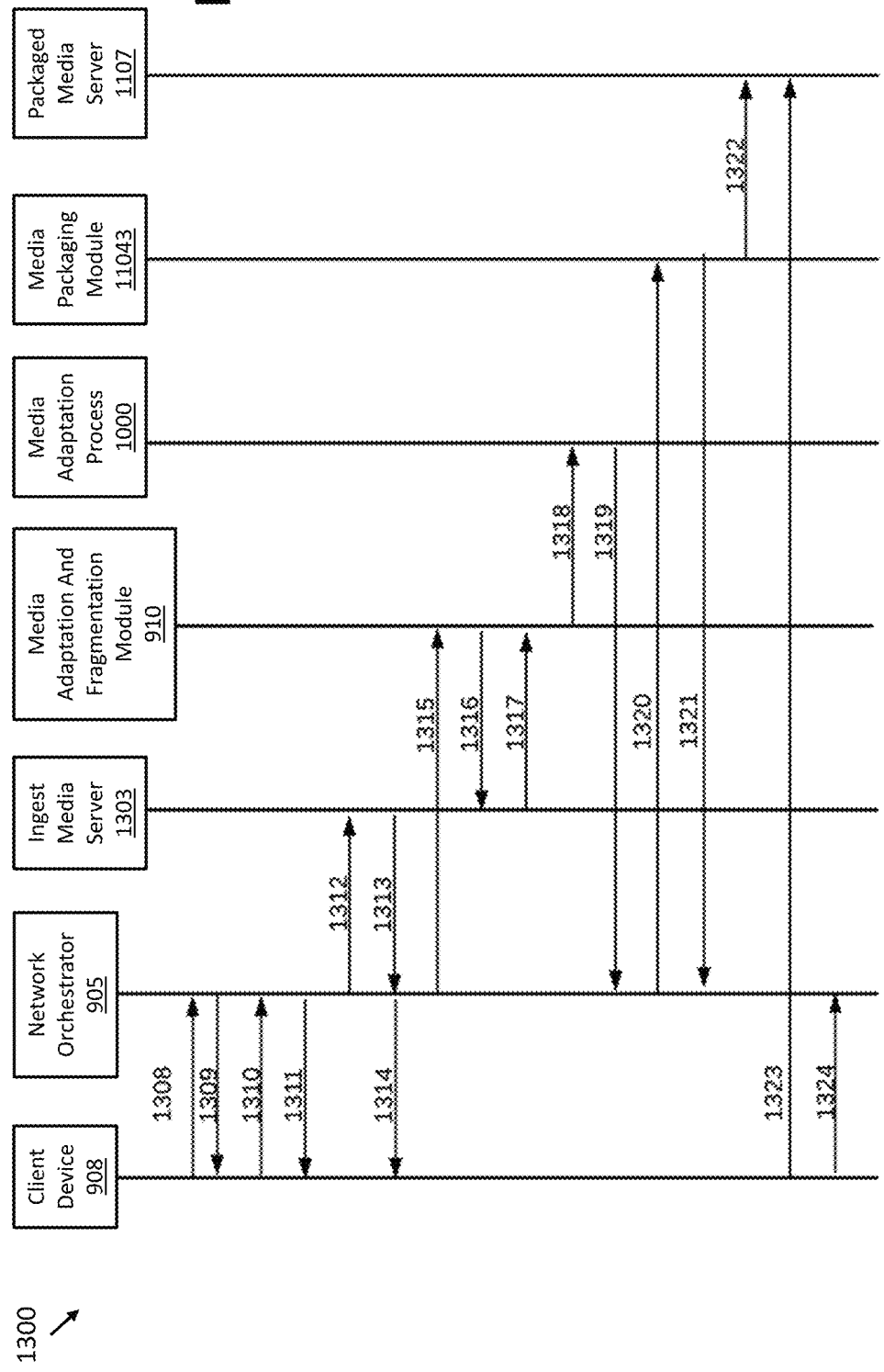
FIG. 13 is an exemplary workflow illustrating a communication flow between components, according to embodiments.

FIG. 13 is a sequence diagram illustrating an example of data and communication flow between components in accordance with embodiments. The sequence diagram of FIG. 13 is of a network adapting a specific immersive media in an ingest format to a stream-able and suitable distribution format for a specific immersive media client end-point. The data and communication flow may be as follows.

The client device 908 initiates a media request 1308 to the network orchestrator 905. In some embodiments, the request may be made to a network distribution interface of the client device. The media request 1308 includes information to identify the media that is requested by the client device 908. The media request may be identified by, e.g., a uniform resource name (URN) or another standard nomenclature. The network orchestrator 905 then responds to the media request 1308 with profile requests 1309. The profile requests 1309 request that the client provide information about currently available resources (including compute, storage, percent battery charged, and other information to characterize the current operating status of the client). The profile requests 1309 also request that the client provide one or more NN models that may be used by the network for NN inferencing to extract or interpolate the correct media views to match the features of the client's presentation system, if such NN models are available at the client end-point.

The client device 908 then follows with a response 1310 from client device 908 to network orchestrator 905 provided as a client token, application token, and one or more NN model tokens (if such NN model tokens are available at the client end-point). The network orchestrator 905 then provides the client device with a Session ID token 1311. The network orchestrator 905 then requests ingest media 1312 from a ingest media server 1303. The ingest media server 1303 may include, for example, the ingest media storage 903 or the ingest media format and assets the storage device 1002. The request for ingest media 1312 may also include the URN or other standard name for the media identified in request 1308. The ingest media server 1303 replies to the ingest media 1312 request with a response 1313 which includes an ingest media token. The network orchestrator 905 then provides the media token from the response 1313 in a call 1314 to the client device 908. The network orchestrator 905 then initiates the adaptation process for the requested media in request 1315 by providing the adaptation and fragmentation module 910 with the ingest media token, client token, application token, and NN model tokens. The adaptation and fragmentation module 910 requests access to the ingest media by providing the ingest media server 1303 with the ingest media token at request 1316 to request access to the ingest media assets.

The ingest media server 1303 responds to the request 1316 with an ingest media access token in a response 1317 to the adaptation and fragmentation module 910. The adaptation and fragmentation module 910 then requests that media adaptation process 1000 adapt the ingest media located at the ingest media access token for the client, application, and NN inference models corresponding to the session ID token created and transmitted at the response 1313. A request 1318 from the adaptation and fragmentation module 910 to the media adaptation process 1000 is made. The request 1318 contains the required tokens and session ID. The media adaptation process 1000 provides the network orchestrator 905 with an adapted media access token and session ID in an update response 1319. The network orchestrator 905 then provides the media packaging module 11043 with the adapted media access token and session ID in an interface call 1320. The media packaging module 11043 provides a response 1321 to the network orchestrator 905 with the packaged media access token and session ID in the response 1321. The media packaging module 11043 then provides, in response 1322, the packaged assets, URNs, and the packaged media access token for the session ID to a packaged media server 1307 to be stored. Subsequently, the client device 908 executes a request 1323 to the packaged media server 1307 to initiate the streaming of media assets corresponding to the packaged media access token received in the response 1321. Finally, the client device 908 executes other requests and provides status updates in message 1324 to the network orchestrator 905.

FIG. 14A illustrates a workflow for the media reuse analyzer 911 shown in FIG. 9. The media reuse analyzer 911 analyses metadata related to the uniqueness of an object of a scene included in the media data.

At 1405, media data is obtained from, e.g., a content provider or content source. At 1410, initialization is performed. Specifically, an iterator "i" is initialized to zero. The iterator may be, for example, a counter. A set of lists of unique assets 1465 (shown in FIG. 14B) for each scene that identify unique assets encountered across all scenes comprising a presentation (as shown in FIG. 3 and/or FIG. 4) are also initialized.

At 1415, it is determined if a value of the iterator "i" is less than the total number of scenes N comprising the presentation. If the value of the iterator "i" is equal to (or greater than) the number of scenes N comprising the presentation (NO at 1415), then the processing proceeds to 1420 wherein the reuse analysis is terminated (i.e., the process ends). If the value of the iterator "i" is less than the number of scenes N comprising the presentation (YES at 1415), then the processing proceeds to 1425. At 1425, the value of an iterator "j" is set to zero.

Subsequently, at 1430, it is determined if the value of the iterator "j" it is less than the total number of media assets X (also referred to as media objects) in a current scene. If the value of the iterator "j" is equal to (or greater than) the total number of media assets X for scene s (NO at 1435), then the processing proceeds to 1410 wherein the iterator "i" is incremented by 1 before returning to 1415. If the value of the iterator "j" is less than the total number of media assets X for scene s (YES at 1430), then the processing proceeds to 1440.

At 1440, the features of the media assets are compared to assets previously analyzed from scenes prior to the current scene (i.e., scene s) to determine if a current media asset has previously been used.

If the current media asset has been identified as a unique asset (NO at 1440), i.e., the current media asset has not previously been analyzed in scenes associated with smaller values of iterator "i", then the processing proceeds to 1445. At 1445, a unique asset entry is created in the set of lists of unique assets 1465 corresponding to the current scene (i.e., scene s). A unique identifier is also assigned to the unique asset entry, and the number of times (e.g., the frequency) that the asset has been used across scenes 0 to N−1 is set to 1. Then, the processing proceeds to 1455.

If the current media asset has been identified as an asset used in one or more scenes prior to scene s (YES at 1440), then the processing proceeds to 1450. At 1450, the number of times the current media asset has been used across scenes 0 to N−1 is incremented by 1 in the set of lists of unique assets 1465 corresponding to the current scene (i.e., scene s). Then, the processing proceeds to 1455.

At 1455, the value of the iterator "j" is incremented by 1. Subsequently, the processing returns to 1430.

In some embodiments, the media reuse analyzer 911 may further signal the client, for example client device 108, that the client should use a copy of the asset for each instance (following the first time that the asset was distributed to the client) that asset is used in a set of at scenes.

Note that the steps in the sequence diagram and workflow described with reference to FIGS. 13-14 are not intended to limit the configuration of data and communication flow in embodiments. For example, one or more of the steps may be performed simultaneously, data may be stored and/or flow to in directions not explicitly illustrated in the flow of FIGS. 13-14A, etc.

FIG. 14B is an example of the set of lists of unique assets 1465 initialized in 1410 (and potentially updated at 1445-1450) for all scenes upon completion of the presentation, according to embodiments. A list of unique assets in the set of lists of unique assets 1465 may be identified a priori or pre-defined by the network or the client device. The set of lists of unique assets 1465 shows a sample list of entries of information describing assets that are unique with respect to the entire presentation, including an indicator for the type of media (e.g., Mesh, Audio, or Volume) that comprise the asset, a unique identifier for the asset, and the number of times that the asset is used across the set of scenes that comprise the entire presentation. As an example, for Scene N−1, there are no assets included in its list because all assets that are required for Scene N−1 have been identified as assets that are also used in Scenes 1 and Scene 2.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for streaming scene-based media assets during a media streaming session performed by a computing device, the method comprising:
   providing a bi-directional interface for communicating information about scene-based media assets between a network server and the computing device acting as a client device;
   providing, to the network server via the interface, client device attributes and corresponding information related to availability of client device resources when requested, wherein the client device attributes and the information are used by the computing device for rendering the scene-based media assets;
   receiving a request from the network server via the interface, the request identifying one or more scene-based media assets to be streamed;
   accessing a list of locally stored, previously streamed scene-based media assets in response to the request to identify the requested one or more scene-based media assets among the list of locally stored, previously streamed scene-based media assets; and
   sending the requested one or more scene-based media assets to the network server via the interface, wherein the network server is configured to distribute information about the one or more scene-based media assets to a plurality of computing devices.

2. The method according to claim 1, wherein the network server is configured to generate a proxy for a requested scene-based media asset and insert the proxy into the media streaming session in accordance with a determination that there is no need to stream the requested scene-based media asset from the network server.

3. The method according to claim 1, wherein the request is generated at the network server after a determination that the requested one or more scene-based media assets have been generated by the network server.

4. The method according to claim 1, wherein the request is generated at the network server before a determination that the requested one or more scene-based media assets have been generated by the network server.

5. The method according to claim 4, wherein the method further comprises:
   sending, to the network server via the interface, the client device attributes and related information concerning availability of client device resources, wherein the network server is configured to distribute information about the one or more scene-based media assets to the computing device in accordance with the client device attributes and related information concerning availability of client device resources.

6. The method according to claim 1, wherein the method further comprises:
   receiving a user request from a user of the client device, the user request identifying the one or more scene-based media assets to be streamed; and
   forwarding the user request to the network server via the interface.

7. The method according to claim 6, wherein the method further comprises:
   receiving, from the network server via the interface, the one or more scene-based media assets in the media streaming session generated by the network sever; and
   storing the one or more scene-based media assets in a media store accessible to the client device.

8. A computing device comprising:
   at least one memory configured to store computer program code; and
   at least one processor configured to execute the computer program code to perform a method of streaming scene-based media assets during a media streaming session, the method including:
   providing a bi-directional interface for communicating information about scene-based media assets between a network server and the computing device acting as a client device;
   providing, to the network server via the interface, client device attributes and corresponding information related to availability of client device resources when requested, wherein the client device attributes and the information are used by the computing device for rendering the scene-based media assets;
   receiving a request from the network server via the interface, the request identifying one or more scene-based media assets to be streamed;
   accessing a list of locally stored, previously streamed scene-based media assets in response to the request to identify the requested one or more scene-based media assets among the list of locally stored, previously streamed scene-based media assets; and
   sending the requested one or more scene-based media assets to the network server via the interface, wherein the network server is configured to distribute information about the one or more scene-based media assets to a plurality of computing devices.

9. The computing device according to claim 8, wherein the network server is configured to generate a proxy for a requested scene-based media asset and insert the proxy into the media streaming session in accordance with a determination that there is no need to stream the requested scene-based media asset from the network server.

10. The computing device according to claim 8, wherein the request is generated at the network server after a determination that the requested one or more scene-based media assets have been generated by the network server.

11. The computing device according to claim 8, wherein the request is generated at the network server before a determination that the requested one or more scene-based media assets have been generated by the network server.

12. The computing device according to claim 11, wherein the method further comprises:
   sending, to the network server via the interface, the client device attributes and related information concerning availability of client device resources, wherein the network server is configured to distribute information about the one or more scene-based media assets to the computing device in accordance with the client device attributes and related information concerning availability of client device resources.

13. The computing device according to claim 8, wherein the method further comprises:
receiving a user request from a user of the client device, the user request identifying the one or more scene-based media assets to be streamed; and
forwarding the user request to the network server via the interface.

14. The computing device according to claim 13, wherein the method further comprises:
receiving, from the network server via the interface, the one or more scene-based media assets in the media streaming session generated by the network sever; and
storing the one or more scene-based media assets in a media store accessible to the client device.

15. A non-transitory computer-readable medium storing instructions that, when executed by at least one processor of a computing device, cause the computing device to perform a method of streaming scene-based media assets during a media streaming session, the method including:
providing a bi-directional interface for communicating information about scene-based media assets between a network server and the computing device acting as a client device;
providing, to the network server via the interface, client device attributes and corresponding information related to availability of client device resources when requested, wherein the client device attributes and the information are used by the computing device for rendering the scene-based media assets;
receiving a request from the network server via the interface, the request identifying one or more scene-based media assets to be streamed;
accessing a list of locally stored, previously streamed scene-based media assets in response to the request to identify the requested one or more scene-based media assets among the list of locally stored, previously streamed scene-based media assets; and
sending the requested one or more scene-based media assets to the network server via the interface, wherein the network server is configured to distribute information about the one or more scene-based media assets to a plurality of computing devices.

16. The non-transitory computer-readable medium according to claim 15, wherein the network server is configured to generate a proxy for a requested scene-based media asset and insert the proxy into the media streaming session in accordance with a determination that there is no need to stream the requested scene-based media asset from the network server.

17. The non-transitory computer-readable medium according to claim 15, wherein the request is generated at the network server after a determination that the requested one or more scene-based media assets have been generated by the network server.

18. The non-transitory computer-readable medium according to claim 15, wherein the request is generated at the network server before a determination that the requested one or more scene-based media assets have been generated by the network server.

19. The non-transitory computer-readable medium according to claim 18, wherein the method further comprises:
sending, to the network server via the interface, the client device attributes and related information concerning availability of client device resources, wherein the network server is configured to distribute information about the one or more scene-based media assets to the computing device in accordance with the client device attributes and related information concerning availability of client device resources.

20. The non-transitory computer-readable medium according to claim 15, wherein the method further comprises:
receiving a user request from a user of the client device, the user request identifying the one or more scene-based media assets to be streamed; and
forwarding the user request to the network server via the interface.

* * * * *